United States Patent
Dekar

(10) Patent No.: US 9,566,714 B2
(45) Date of Patent: Feb. 14, 2017

(54) APPARATUS FOR MONITORING FOOD CONSUMPTION BY AN INDIVIDUAL

(71) Applicant: Desin, LLC, Birmingham, MI (US)

(72) Inventor: Jonathan P. Dekar, Bloomfield Hills, MI (US)

( * ) Notice: Subject to any disclaimer, the term of this patent is extended or adjusted under 35 U.S.C. 154(b) by 0 days.

(21) Appl. No.: 14/793,850

(22) Filed: Jul. 8, 2015

(65) Prior Publication Data

US 2015/0306771 A1    Oct. 29, 2015

Related U.S. Application Data

(63) Continuation of application No. 14/280,094, filed on May 16, 2014, now Pat. No. 9,101,238, which is a continuation of application No. 13/834,245, filed on Mar. 15, 2013, now Pat. No. 8,761,922, which is a continuation-in-part of application No. 13/529,536, filed on Jun. 21, 2012, now Pat. No. 8,442,669.

(60) Provisional application No. 61/545,305, filed on Oct. 10, 2011.

(51) Int. Cl.

| | |
|---|---|
| *G06F 7/00* | (2006.01) |
| *B25J 11/00* | (2006.01) |
| *G09B 19/00* | (2006.01) |
| *A47G 21/08* | (2006.01) |
| *B25J 13/08* | (2006.01) |
| *A47G 23/10* | (2006.01) |
| *A47G 21/00* | (2006.01) |
| *A47G 23/12* | (2006.01) |

(52) U.S. Cl.
CPC ............. *B25J 11/008* (2013.01); *A47G 21/00* (2013.01); *A47G 21/08* (2013.01); *A47G 23/10* (2013.01); *A47G 23/12* (2013.01); *B25J 13/08* (2013.01); *G09B 19/0092* (2013.01)

(58) Field of Classification Search
None
See application file for complete search history.

(56) References Cited

U.S. PATENT DOCUMENTS

| 5,282,711 A | 2/1994 | Frische | |
|---|---|---|---|
| 6,592,315 B2 * | 7/2003 | Osborne, Jr. | .......... A47G 21/08 414/730 |
| 7,841,819 B1 | 11/2010 | Barres | |

(Continued)

FOREIGN PATENT DOCUMENTS

FR    2692460 A1    12/1993

*Primary Examiner* — Yolanda Cumbess
(74) *Attorney, Agent, or Firm* — Burgess Law Office, PLLC

(57) ABSTRACT

An apparatus for monitoring food consumption by an individual from a food compartment wherein the food compartment may contain or hold solids or liquids. In one example, the apparatus includes a feed arm operative to transfer food from the food compartment to an individual; and, a sensor(s) used in part to determine the quantity or type of the solid or liquids in the food compartment or container. Determining the quantity and/or type of food in the food compartment prior to and after the individual has ceased consuming food from the food compartment the amount or quantity of the food can be determined. Based on such knowledge the nutritional value of the food may be determined and if needed transmitted to a remote location. In addition, sensors may also monitor an individual's physical data and communicate such data to a remote location.

12 Claims, 19 Drawing Sheets

(56) References Cited

U.S. PATENT DOCUMENTS

| | | |
|---|---|---|
| 2002/0064438 A1 | 5/2002 | Osborne, Jr. |
| 2007/0144446 A1 | 6/2007 | Neckel |
| 2009/0104004 A1* | 4/2009 | Guglielmelli .......... A47G 21/08 414/9 |
| 2010/0111383 A1* | 5/2010 | Boushey .................. G06K 9/00 382/128 |
| 2011/0226185 A1 | 9/2011 | Stadler et al. |
| 2012/0191038 A1 | 7/2012 | Gerber |

\* cited by examiner

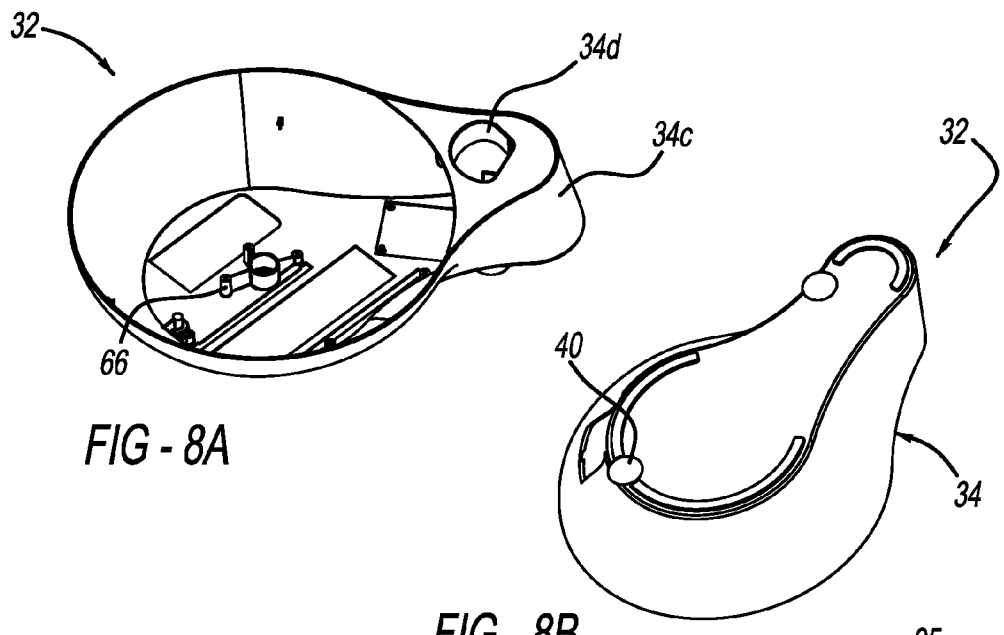
FIG - 8A
FIG - 8B
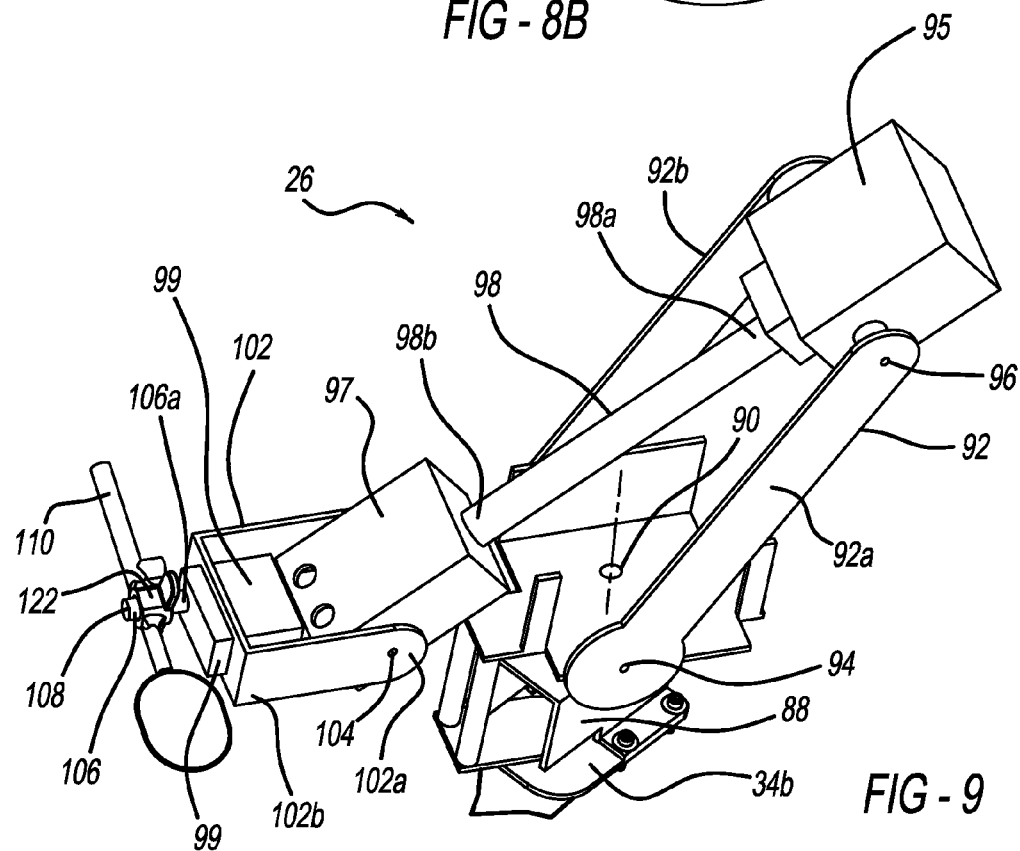
FIG - 9

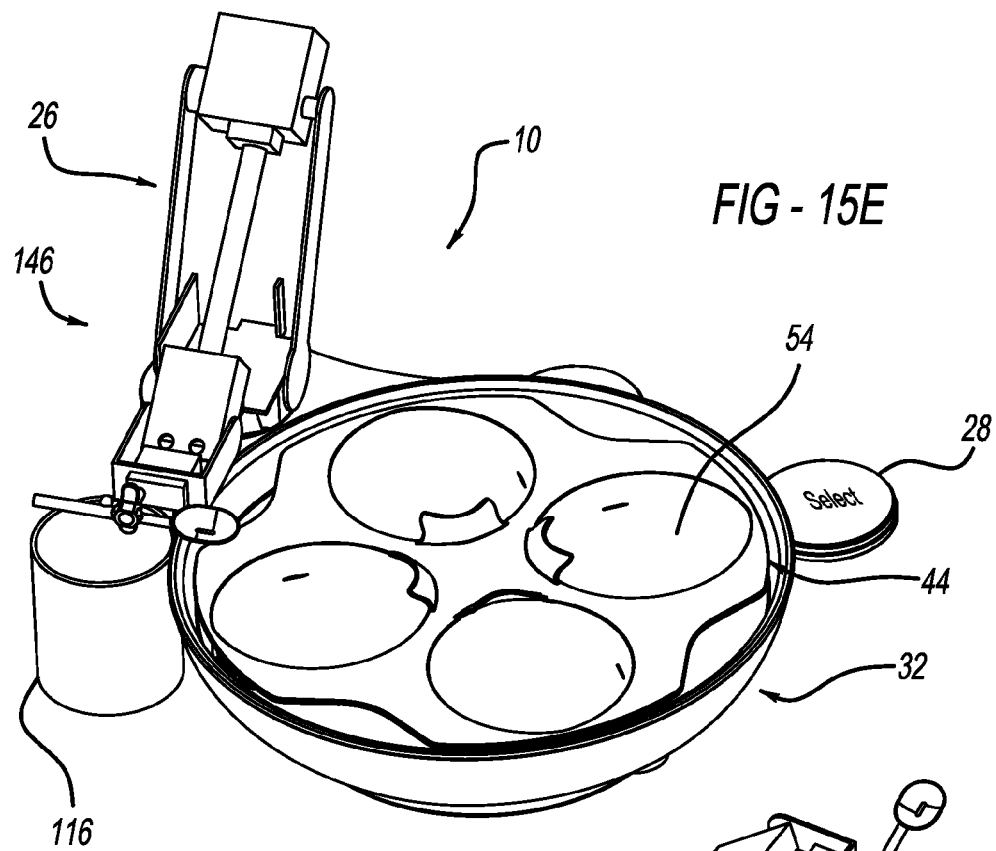
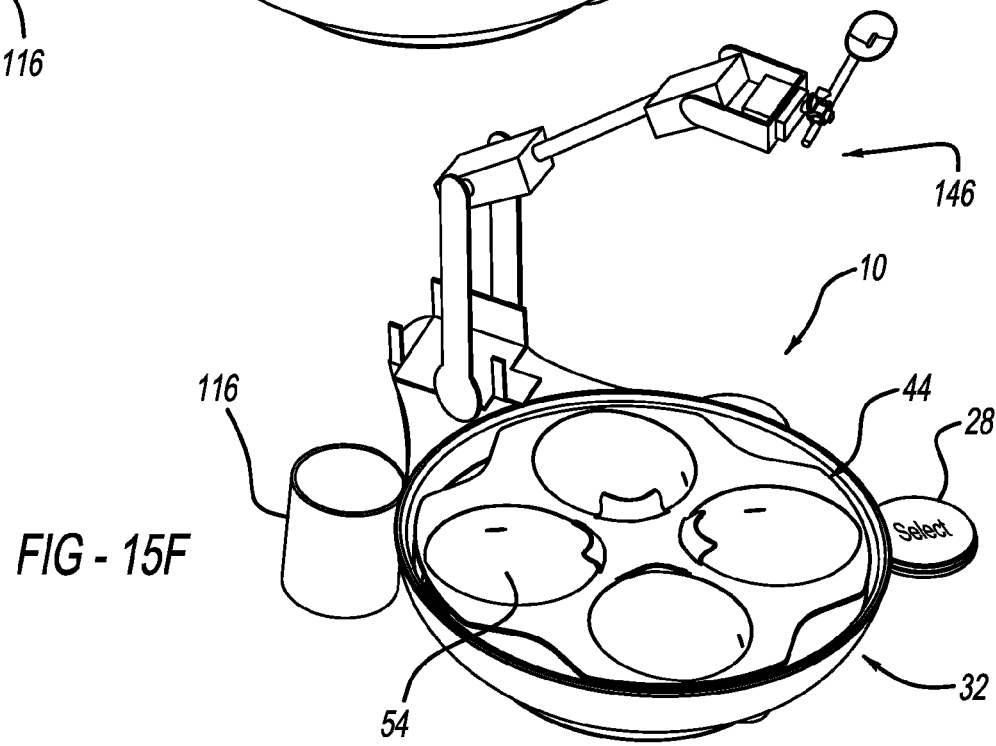

APPARATUS FOR MONITORING FOOD CONSUMPTION BY AN INDIVIDUAL

CROSS REFERENCE TO RELATED APPLICATIONS

This application is a continuation of U.S. Non-Provisional application Ser. No. 14/280,094, filed May 16, 2014 which is a continuation of U.S. Non-Provisional application Ser. No. 13/834,245 (now U.S. Pat. No. 8,761,922), filed Mar. 15, 2013, which is a continuation-in-part of U.S. Non-Provisional application Ser. No. 13/529,536 (now U.S. Pat. No. 8,442,669), filed Jun. 21, 2012. U.S. Non-Provisional application Ser. No. 13/529,536 claims the benefit of U.S. Provisional Application No. 61/545,305 filed on Oct. 10, 2011. The disclosures of the above applications are incorporated herein by reference in their entirety.

BACKGROUND

The present application relates to a self-feeding device and in particular to a self-feeding device for use by an individual or multiple individuals and a method of controlling the self-feeding device.

Nutrition is a basic human need, and the ability to feed one's self is a skill that is critical to fulfilling this need. However, at times, the ability to feed one's self may be compromised due to factors such as a physical disability, age, schedules or the like. For such an individual, they may be reliant on a caregiver to provide assistance in eating and drinking. Such reliance may be a source of frustration for the individual, since they do not have control over the meal, including food choice, order, rate or other requirements.

While an assistive aid that allows for self-feeding is available, these devices have certain limitations that restrict their use. Some self-feeding devices only accommodate a limited range of user capabilities, requiring a high degree of user dexterity or mobility. Other self-feeding devices constrain the user in selecting the order of food intake, or even in the types of foods that can be accommodated, i.e. soups or other liquids. Still other self-feeding devices have limited acceptance since they are bulky, and non-portable. Others do not facilitate drinking of beverages during the meal.

Thus, there is a need in the art for a portable self-feeding device that can accommodate a wide range of users and their specific needs; requires minimal physical interaction by the user; that in appearance, form and function is highly compatible with a conventional dining experience, and allows the user to choose among the various foods presented by the device. Further, there is a need for a self-feeding device that can be remotely controlled, so that a plurality of users may each use a device concurrently with minimal supervision or interaction.

SUMMARY OF THE DISCLOSURE

The present disclosure describes a feeding device. The feeding device includes a feed arm operative to transfer food from a food compartment to a feed position, typically adjacent an individual. The feeding device further includes a sensor that detects a characteristic or quality to determine the type or quantity of food in the food compartment. The present disclosure contemplates using the feeding device with a database and processor to identify the nutritional value of food in the food compartment based in part on information from the sensor.

Further, the present disclosure contemplates using the feeding device or apparatus as disclosed with an additional sensor monitoring physical data of the individual and a communications module receiving and transmitting said physical data to a remote location.

Other features and advantages of the present disclosure will become readily appreciated based upon the following description when considered in conjunction with the accompanying drawings.

DESCRIPTION OF THE DRAWINGS

FIG. 8a is a perspective view of a base assembly for the self-feeding device of FIG. 1.

FIG. 8b is a bottom view of the base assembly of FIG. 8a.

FIG. 9 is a perspective view of a feed arm assembly for the self-feeding device of FIG. 1.

FIG. 15e is an elevational view illustrating a second transfer position of the feed arm assembly for the self-feeding device of FIG. 1.

FIG. 15f is an elevational view illustrating a mouth locating position of the self-feeding device for the self-feeding device of FIG. 1.

DESCRIPTION

Figure 1:
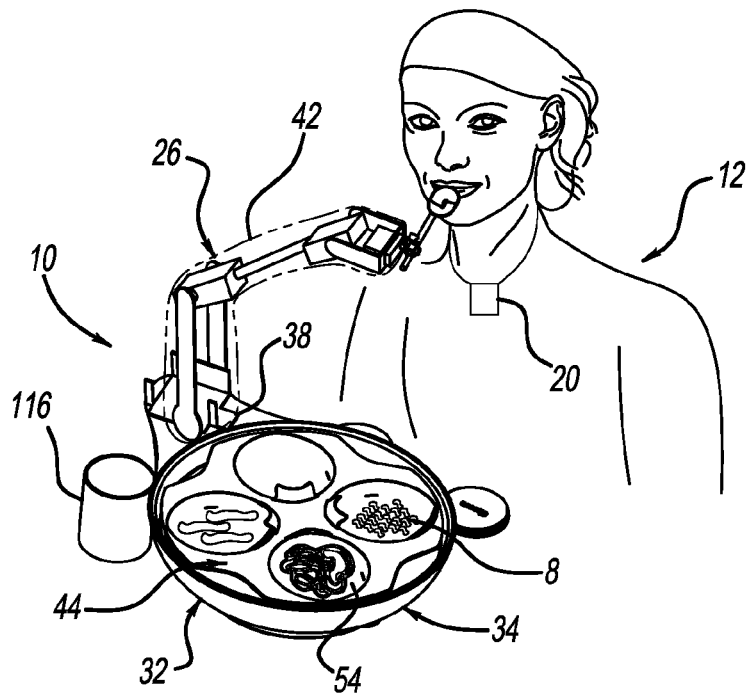
FIG. 1 is an elevational view of a self-feeding device.
Figure 2:
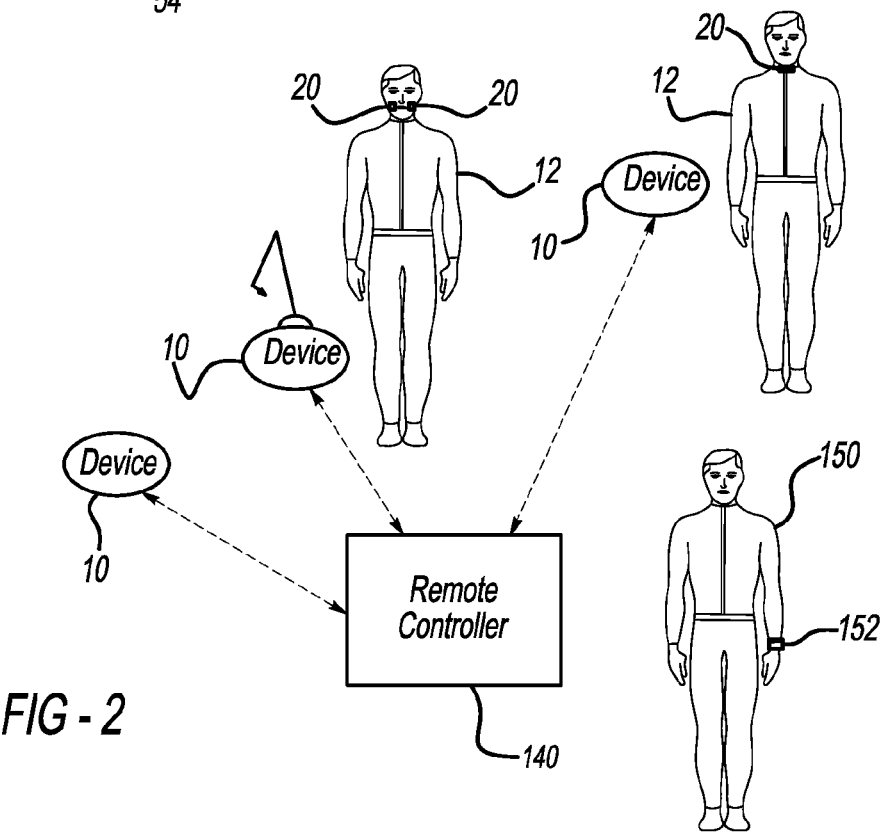
FIG. 2 is a diagrammatic view of a system for using the self-feeding device of FIG. 1 with multiple users.

Referring to FIGS. 1-12, a self-feeding device 10 for feeding a user is generally illustrated herein. The self-feeding device 10 may be utilized by one user 12, or a plurality of self-feeding devices 10 can concurrently be used to feed move than one user 12 as shown in FIG. 2. The self-feeding device 10 allows a user 12 to independently and selectively feed themselves according to the user's desires and specific intention. The self-feeding device 10 is portable, and can be used in a variety of settings, such as a table, bed, or the like. Also, the self-feeding device 10 is adaptive, and learns where to place the food item 8 according to the user's anatomy. The self-feeding device 10 is flexible, and a variety of food types may be accommodated, including solid, liquid, pureed, or the like.

The self-feeding device 10 includes a base assembly 32 that contains the food item 8 and supports a feed arm assembly 26 in a manner to be described. The base assembly 32 includes a housing 34 having an upper wall 34a, an opposed lower wall 34b, and a sidewall 34c extending therebetween. An interior cavity is formed by the walls of the housing assembly 34, to house and protect the components, such as motors, electronics and controls, for the self-feeding device 10 in a manner to be described. Further, the housing upper wall 34a may completely or partially enclose the interior space of the base assembly 32. The housing upper wall 34a may be a separate member, i.e. part of the plate assembly, or integral with the housing lower wall and side wall. The housing upper wall 34a or plate assembly 44 may serve as a food compartment receiving portion 36 of the base assembly 32 in a manner to be described. The base assembly 32 also includes a feed arm support portion 38, which in this example is adjacent the food compartment plate receiving portion 36, and provides an attachment surface for the feed arm assembly 26. The feed arm 26 is removably mounted to the base assembly 32 using a fastening mechanism, such as via a magnetic attachment, fastener or the like. In an example, the feed arm support portion 38 may include an aperture 34d formed in the housing upper wall 34a for receiving a portion of the feed arm assembly 26, and the feed arm assembly 26 is secured to the housing lower wall 34b via a fastener.

The base assembly 32 may having a mounting element 40 coupled thereto an outer surface of the housing lower wall 34c. The mounting element 40 aids in establishing stable placement of the self-feeding device 10 on a planar surface such as a table, tray, or the like. The mounting element 40 may be any type of tacky material made of a plastic, rubber, silicon, or a suction cup or the like. In another example, the mounting element 40 may be a fastener that has one end secured to the feeding device and a clamp mechanism on the opposing side, such as to attach or secure the assembly to a stand or crane (not illustrated). For example, the clamping mechanism could also allow the self-feeding device 10 to be securely mounted to another surface, such as a non-flat surface or other types of surfaces. For example, the self-feeding device 10 could be mounted to a portion of a chair or bed.

The self-feeding device 10 includes a plate assembly 44 for holding the food item 8, and the plate assembly 44 is operatively disposed in the base assembly 32. The plate assembly 44 may be fixed or rotatable via selective actuation of a plate positioning mechanism 46. In an example, the plate positioning mechanism 46 is a motor, although other types of mechanisms for facilitating a predetermined orientation of a position of the plate assembly 44 with respect to the feed arm assembly are contemplated.

The plate assembly 44 of this example is generally round and concave in cross-sectional shape. The plate assembly 44 is adapted to be removably attached to the base assembly 32. For example, the plate assembly 44 may have an attachment feature (not illustrated) located on an underside of the plate (not shown), such as a socket or the like, to secure the plate assembly 44 to the plate positioning mechanism 46. The plate assembly 44 of this example includes an inner plate 48 secured to an outer plate 50. In this example, the outer plate serves as a portion of the housing upper wall 36 to enclose the base assembly 32. An interior of the inner plate 48 forms a compartment 54 for receiving and holding the food item 8. The inner plate 48 could contain one or more food compartments 54. The inner plate 48 and outer plate 50 when removed from the plate assembly 44 can be cleaned, such as by a typical industrial or home dishwasher apparatus.

In an example of a removable food compartment 54, the inner plate 48 includes a frame 52 having an opening 52a, and the food compartment 54 is supported within the frame opening 52a. The frame 52 may have a plurality of openings 52a and a food compartment 54 is supported within the corresponding frame opening 52a, although other configurations are contemplated. In an example of a plate assembly having a fixed food compartment 54, the frame 52 and food compartment 54 are integral and formed as one member. An outermost edge of the frame 52 forms a rim 56 which provides a support feature for the inner plate 48 with respect to the outer plate 50. In the illustrated example, the inner plate 48 contains four food compartments 54, and the shape and number of food compartments is non-limiting. The inner plate 48 may have additional features, such as a cut-away portion integrally formed in the in the rim as shown at 48a, that acts as a removal handle for disengaging the inner plate 48 from an outer plate 50.

The inner plate 48 may also include an integrally formed tab 58 that extends from an edge of the food compartment into a center of the food compartment 54. The tab 58 may serve as a food guard. The tab or food guard 58 may extend upwardly away from the food compartment 54 and at a predetermined angle towards a center of the food compartment 54. Further, a tab or food guard 58 may be associated with each corresponding food compartment 54. In another example of a removable food compartment, the tab 58 may be formed in the food compartment 54 and also provide a gripping surface for removing the food compartment 54 in addition to a serving as a food guard.

The food compartment 54 likewise has a predetermined shape that is designed to allow for efficient food capture by the feed arm assembly 40. The food compartment 54 may be formed using a material having a natural high lubricity, such as a plastic material. Such a material encourages, in conjunction with the shape of the food compartment 54, the food product to gather in the center of the food compartment 54, where it may be effectively captured by the feed arm assembly 26. Each food compartment 54 may also be configured in such a way as to retain the food within the food compartment 54. The food compartment 54 may include other features, such as an integrally formed fill line 60 at one or more predetermined locations of the food compartment. For example, the fill line 60 may indicate an uppermost location at which a food item 8 may be filled to in the food compartment 54.

The outer plate 50 has a shape that is complementary to that of the inner plate 48 and the base assembly. In this example, the outer plate 50 is generally circular in shape, and includes an integrally formed food compartment corresponding in shape to that of the inner plate food compartment 54. The inner plate 48 may be orientated and retained by the outer plate 50 in a positive manner via an engagement mechanism. For example, an engagement rib 62 may be integrally formed on an outer surface of the inner plate 48, and a complementary engagement channel 64 may be formed in an inner surface of the outer plate 50, such that the inner plate engagement rib 62 is retained within the outer plate engagement channel 64 in a positive manner, forming a mechanical lock that can be unlocked so that the outer plate and inner plate can be disassembled, such as for cleaning purposes or for personalization preferences. Other types of engagement mechanisms are contemplated so that the inner plate 48 and outer plate 50 can rotate together as one unit.

Figure 6:
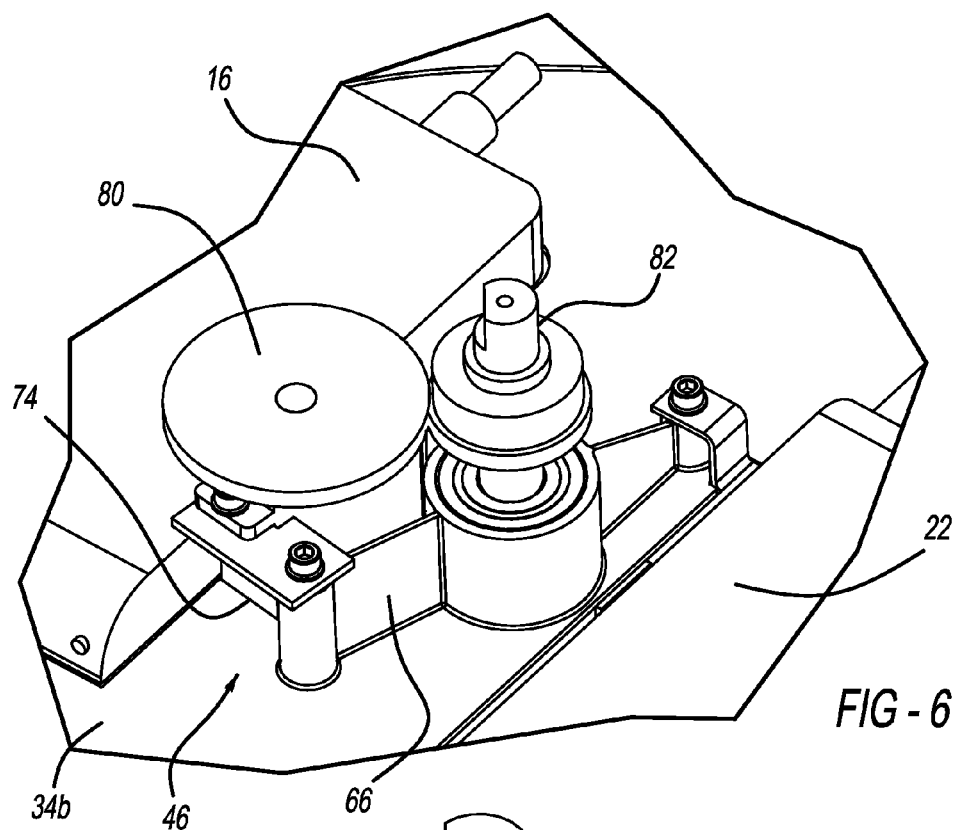
FIG. 6 is an enlarged elevational view of a plate positioning mechanism for the self-feeding device of FIG. 1.
Figure 7:
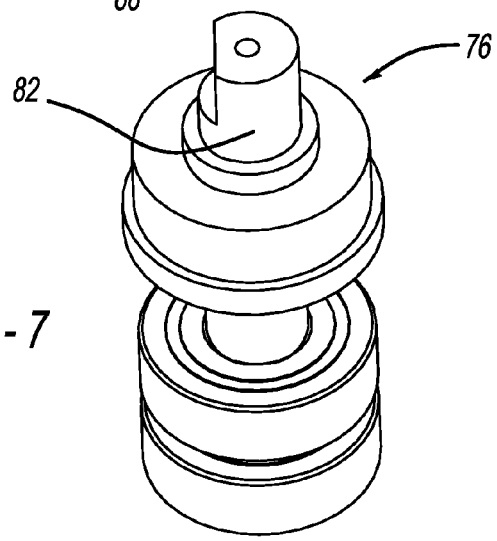
FIG. 7 is an enlarged elevational view of a portion of the plate positioning mechanism of FIG. 6.

Referring to FIGS. 6-7, the self-feeding device 10 may also include a plate positioning mechanism 46 for rotatably controlling positional movement of the plate assembly 44 with respect to the base assembly 32. The plate positioning mechanism 46 is secured to the base assembly. For example, the base assembly 32 may include a mounting boss 66 projecting upwardly from an inner surface of the housing lower wall 34*b* for locating the components of the plate positioning mechanism 46. A portion of the plate positioning mechanism 46 may be received within a socket (not illustrated) formed in the outer plate 50 in a manner to be described. An outer surface of the outer plate 50 may include a groove or indentation for receiving a roller track 70 to facilitate rotational movement of the plate assembly 44. The roller track 70 is ring-shaped and in this example may be configured to slidably engage the plate positioning mechanism 46. The plate assembly 44, via the roller track 70, may be supported within the base assembly 32 via an integrally formed support feature 72 spaced circumferentially around the housing side wall 34*c*. The base assembly 32 may include other types of mounting features, such as another mounting boss situated on an inner surface of the housing.

The plate positioning mechanism 46 also includes a plate actuator 74 that controls movement of the plate assembly 44. In this example the plate actuator 74 is a motor, although other types of actuators may be utilized. The plate actuator 74 is operatively connected to a drive assembly 76. The drive assembly 76 of this example includes a motor mount, such as a ball bearing or the like. The plate actuator 74 is coupled to the motor mount, and actuates a drive gear 80 that is coupled to a drive shaft 82. The drive shaft 82 operatively engages the plate assembly 44 to control the rotational movement of the plate assembly 44. In this example, the drive shaft 82 engages the socket formed in the outer plate 50 of the plate assembly 44.

The self-feeding device 10 further includes a controller 14 that operatively controls operation of the device in a manner to be described. For example, the controller 14 effectuates the rotational movement of the plate assembly 44 based on an input signal 118 from the user 12 via a user input device 28. The controller also facilitates movement of the feed arm assembly 26 in a manner to be described. The controller 14 is located within a cavity formed in the base 32. The controller 14 receives various signals, processes the signals and provides an output signal 120 to control the self-feeding device 10. The input signal 118 and output signal 120 may be communicated via a signal transmission protocol, i.e. a wired connection, or a wireless connection via a signal transmission mechanism 16. An example of a signal transmission mechanism 16 is a wireless transceiver, i.e. RFID, Wi-Fi, Bluetooth, Infrared, or the like. The signal transmission mechanism 16 may be integral with another component or stand alone. For example, the controller 14 may include a signal transceiver 16 for communicating with a user input device 28 (e.g., a food choice select button, an eat button, a drink button or the like), and the user input device 28 has a corresponding signal transceiver. The signal transceiver 16 may be integral with a sensing device 20 to transmit the sensed signal. Alternatively, the signal transceiver 16 may be a signal transmitter or a signal receiver that operates according to a predetermined communications protocol, such as a RFID communications protocol.

Figure 3:
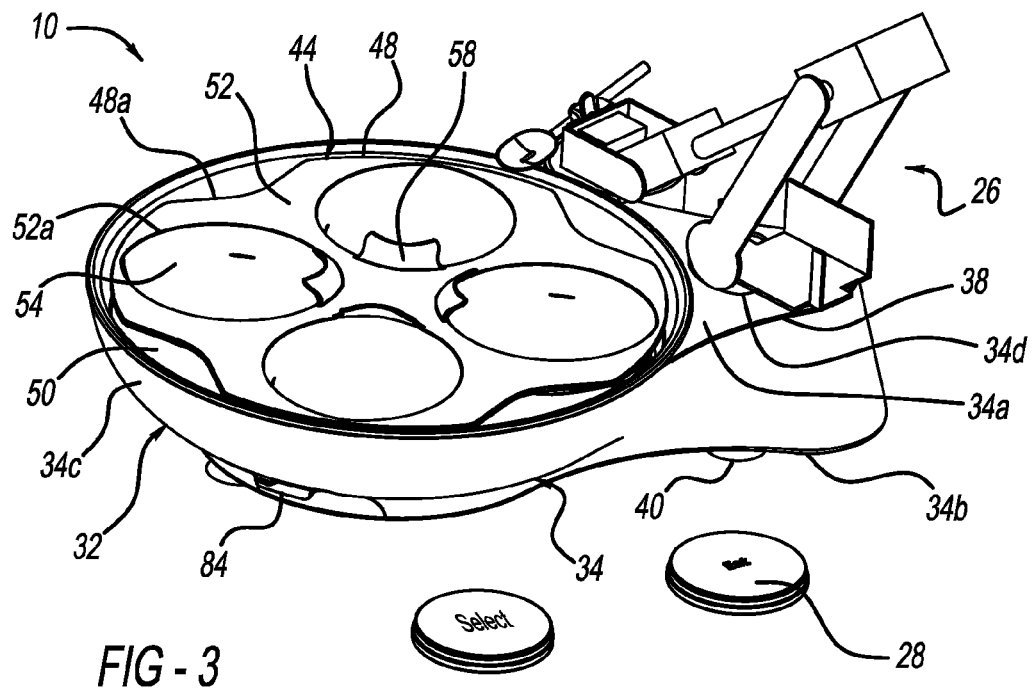
FIG. 3 is another elevational view of the self-feeding device of FIG. 1.
Figure 5:
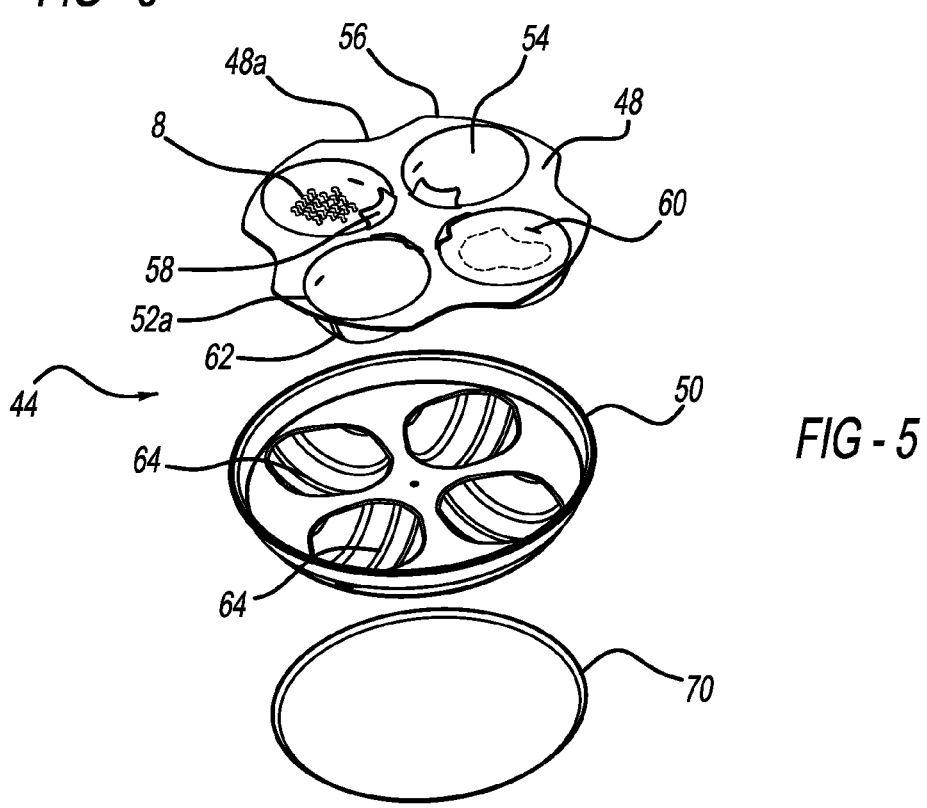
FIG. 5 is an exploded view of the plate assembly for the self-feeding device of FIG. 1.
Figure 4:
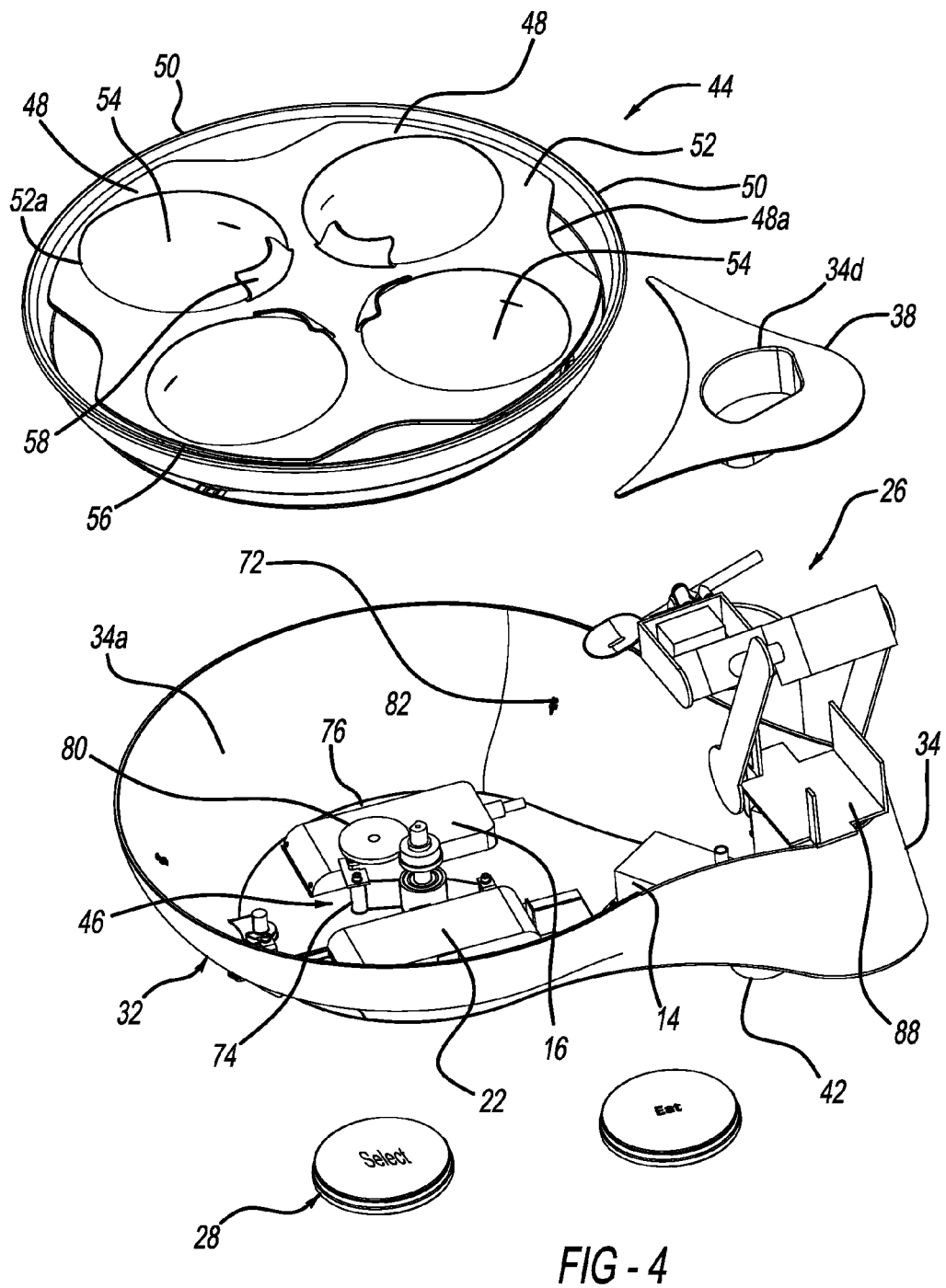
FIG. 4 is an exploded view of the self-feeding device of FIG. 1.

The self-feeding device 10 still further includes a power source 22 that is disposed within the cavity formed in the base assembly 32 and provides power to the various components of the self-feeding device. The power source 22 may be AC or DC or solar or the like. In an example of a battery, the battery may be rechargeable. The power source 22 provides power to the various actuators, such as the controller 14 or the feed arm assembly 26. Access to the power source 22 may be provided via a door 84 formed in the base housing 34 as shown in FIG. 3.

Figure 15A:
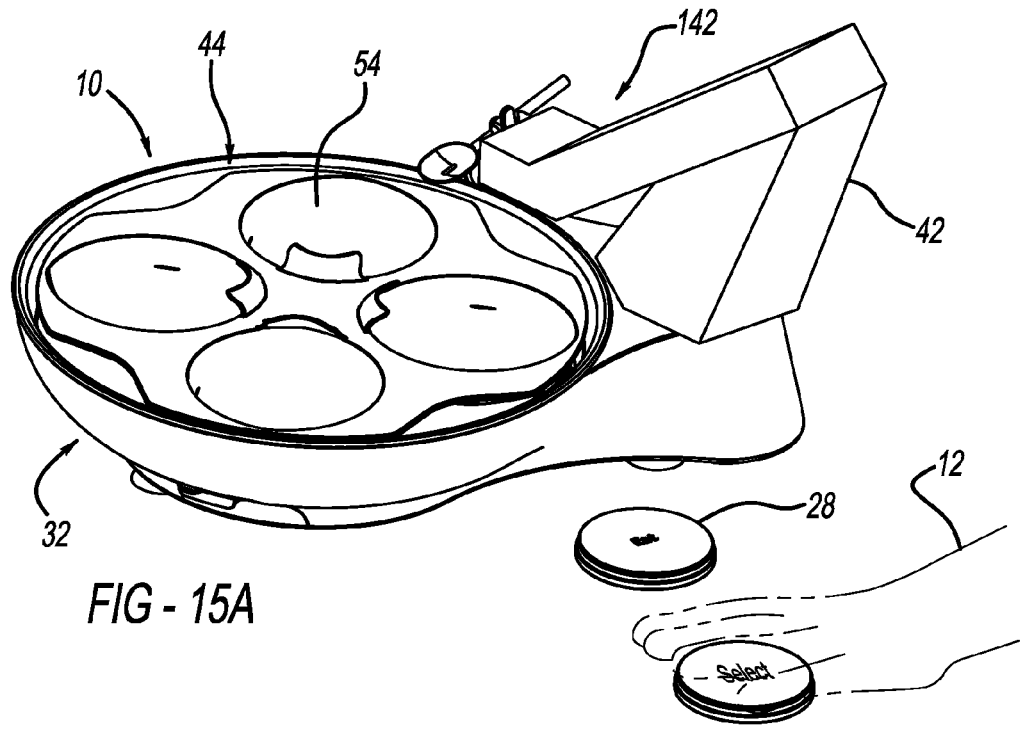
FIG. 15a is an elevational view illustrating the self-feeding device of FIG. 1 in a storage position.

Referring to FIG. 9, the feed arm assembly 26 is a robotic arm assembly that transfers food or drink between the food compartment 54 or a cup 116, and the user 12. The feed arm assembly 26 employs multiple arms and actuators, which enables arm movement with multiple degrees of freedom, such as motion related to the angular motion in the roll (z), pitch (x), and yaw (y) direction or the like. The example provided illustrates a feed arm assembly 26 having five degrees of freedom (n), although in other examples, the feed arm assembly could have fewer or more degrees of freedom (n) depending on how refined or natural of an arm movement is desired. The feed arm assembly 26 includes a feed arm housing 42 that encloses the feed arm and protects the individual components as shown in FIGS. 1 and 15*a*. The feed arm housing is generally cylindrical, and is formed from a plastic material or other such suitable material. The feed arm housing 42 may include a plurality of segments, with each segment interconnected so as to form a flexible joint. Various types of joints are contemplated, depending on the movement associated with the degrees of freedom of the interconnected arm segments that form the feed arm assembly 26.

The feed arm assembly 26 includes a feed arm support member 88. The feed arm support member 88 is secured to the base assembly 32. In an example, the feed arm support member 88 may be attached to the base assembly housing 34. The feed arm support member 88 may be stationary or rotatable depending on the desired action of the feed arm assembly 26. A portion of the feed arm support member 88 may be located within the base assembly housing 34 and extend through the aperture formed in the housing upper wall 34d to provide additional stability and support to the feed arm assembly 26. If rotational, the feed arm support member 88 may be rotational about a first axis 90 that is vertical in order to position the feed plate assembly in a horizontal plane. A first feed arm actuator 91 positioned adjacent the feed arm support member 88, such as a servo motor or the like, facilitates the rotational movement of the feed arm support member 88. The rotational movement of the feed arm assembly 26 positions the arm with respect to a selected food compartment.

The feed arm assembly 26 also includes one or more arms that are pivotally interconnected. The configuration of each of the arms is non-limiting, and determined by the desired movement of the feed arm assembly 26. In this example, a first arm 92 is pivotally connected to the feed arm support member 88 at a second axis 94 that is essentially horizontal, so as to provide pivotal movement of the first arm 92. Further, the first arm 92 of this example is a U-shaped member having a first leg 92a, a second leg 92b opposite the first leg 92a, and a third leg (not illustrated) interconnecting the first leg 92a and second leg 92b. A first end of the first leg 92a and a first end of the second leg 92b are each pivotally connected to the feed arm support member 88 at the second axis 94, and the second axis 94 is essentially perpendicular to the first leg. An example of a first feed arm actuator 91 is a servo motor or the like. A second feed arm actuator 93 controls movement of the first arm 92 in a generally vertical plane with respect to the base assembly 32 about the second pivot axis 94.

The feed arm assembly 26 includes a second arm 98 that is pivotally connected to the second end of the first arm 92 at a third pivot axis 96. The second arm 98 of this example has a first end 98a that is connected to the first arm 92, and an opposed second end 98b that is pivotally connected to a third arm 102. The second arm 98 may be a single bar, or two bars, and the configuration is non-limiting. The second arm 98 is pivotal with respect to the first arm 92. Movement of the second arm 98 is controlled by a third feed arm actuator 95. An example of a third feed arm actuator 95 is a servo motor. The third feed arm actuator 95 may be located within an enclosure formed in the second arm 98. In this example, the feed arm actuator 95 actuates the second arm 98 in a generally vertical plane with respect to the base assembly 32.

The feed arm assembly 26 also includes a third arm 102 pivotally connected to the second arm 98 at a fourth pivot axis 104. The third arm 102 of this example has a first end 102a that is connected to the second arm 98, and an opposed second end 102b that is pivotally connected to a fourth arm 106. The third arm 102 may be a single bar, or two bars, and the configuration is non-limiting. The third arm 102 articulates, or pivots with respect to the second arm 98. Movement of the third arm 102 is controlled by a fourth feed arm actuator 97. An example of a fourth feed arm actuator 97 is a servo motor. The fourth feed arm actuator 97 may likewise be located within an enclosure integrally formed in the third arm 102, which in this example is located at the first end 102a of the third arm 102.

The feed arm assembly 26 of this example also includes a fourth arm 106 pivotally connected to the third arm 102, so as to pivot about a fifth pivot axis 108. The fourth arm 106 of this example has a first end 106a that is connected to the third arm 102. The fourth arm 106 may be a single bar, or two bars, and the configuration is non-limiting. In this example the fourth arm 106 is a shaft. The fourth arm 106 may articulate with respect to the third arm 102 or be fixed.

The feed arm assembly 26 further includes a feed utensil 110 removably connected to the fourth arm 106 via a connector 122. The connection may be fixed, or provide for refined movement of the feed utensil 110 with respect to the fourth arm 106 to position the feed utensil 110 in the mouth of the user 12. Movement of the feeding utensil 110 may be controlled by a fifth actuator 99, such as a servo motor or the like, which may be integral with the feed utensil 110, or located outside the feed utensil 110. Various types of feeding utensils 110 may be utilized, such as a conventionally available straw, knife, spoon, fork, spork or some combination thereof. The feed utensil 110 may be selectively determined to accommodate a liquid or solid food product.

A sensing device 20 and a signal transceiver 16 may be positioned on the feed arm assembly 26, i.e. on the feed utensil 10 or on an arm, for communicating a position of the user's mouth, or locating the position of the user's mouth. An example of a sensing device 20 is a displacement or distance sensor. The feed utensil 110 may be secured to the feed arm assembly 26 using a connector 122, such as a clamp, a screw, an interference fit or the like and the selection is non-limiting. The feed utensil 110 may be interchanged during the meal. Since the feed utensil 110 may include multiple utensils, the user is able to select the most appropriate utensil for the food product being consumed.

Figure 10:
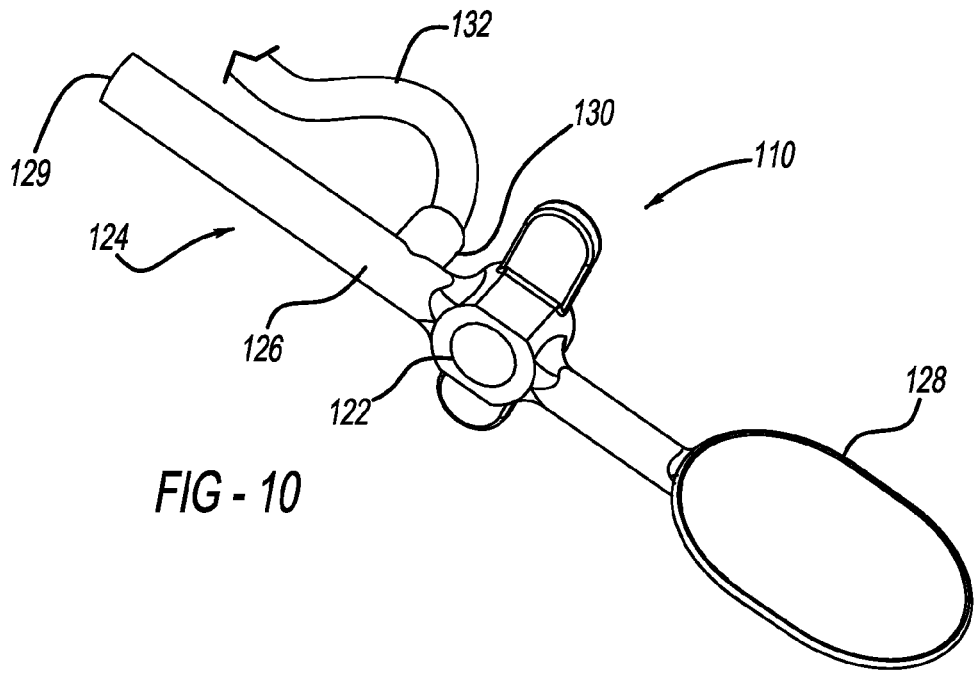
FIG. 10 is a perspective view of a combined spoons and straw for use with the self-feeding device of FIG. 1.

Referring to FIG. 10, an example of a feed utensil 110 that is a combined spoon and straw is shown at 124. The combined spoon and straw 124 is a double-sided apparatus which allows the user 12 to both eat and drink from the same utensil. The combined spoon and straw 124 includes an elongated shaft 126 that is hollow. Secured to one end of the elongated shaft 126 is an integrally formed arcuate member forming a spoon 128 for receiving and transferring the food item 8. In another example, the outermost edge of the spoon includes grooves to form tangs, similar to a fork for spearing the food item 8. The opposite end of the combined spoon and straw 124 is open as shown at 129 to provide egress of the liquid food item 8. The combined spoon and straw 124 may also include a port 130 formed in the shaft 126 for redirecting a liquid through the shaft 126. The feed arm assembly 26 may include a flexible tubing 132 that has one end interconnecting with the port 130 formed in the shaft and a second end disposed with a food compartment or beverage container for a liquid. The liquid food compartment may be integral with the base 32 or a separate liquid receptacle 116, i.e. a cup, glass, or mug that is adjacent thereto. The combined spoon and straw 124 may be formed of a suitable material, such as plastic, metal, or the like. The combined spoon and straw likewise may include a signal transceiver 16 and sensing device 20, such as for communicating a location of the user's mouth or locating the food compartment.

Figure 12:
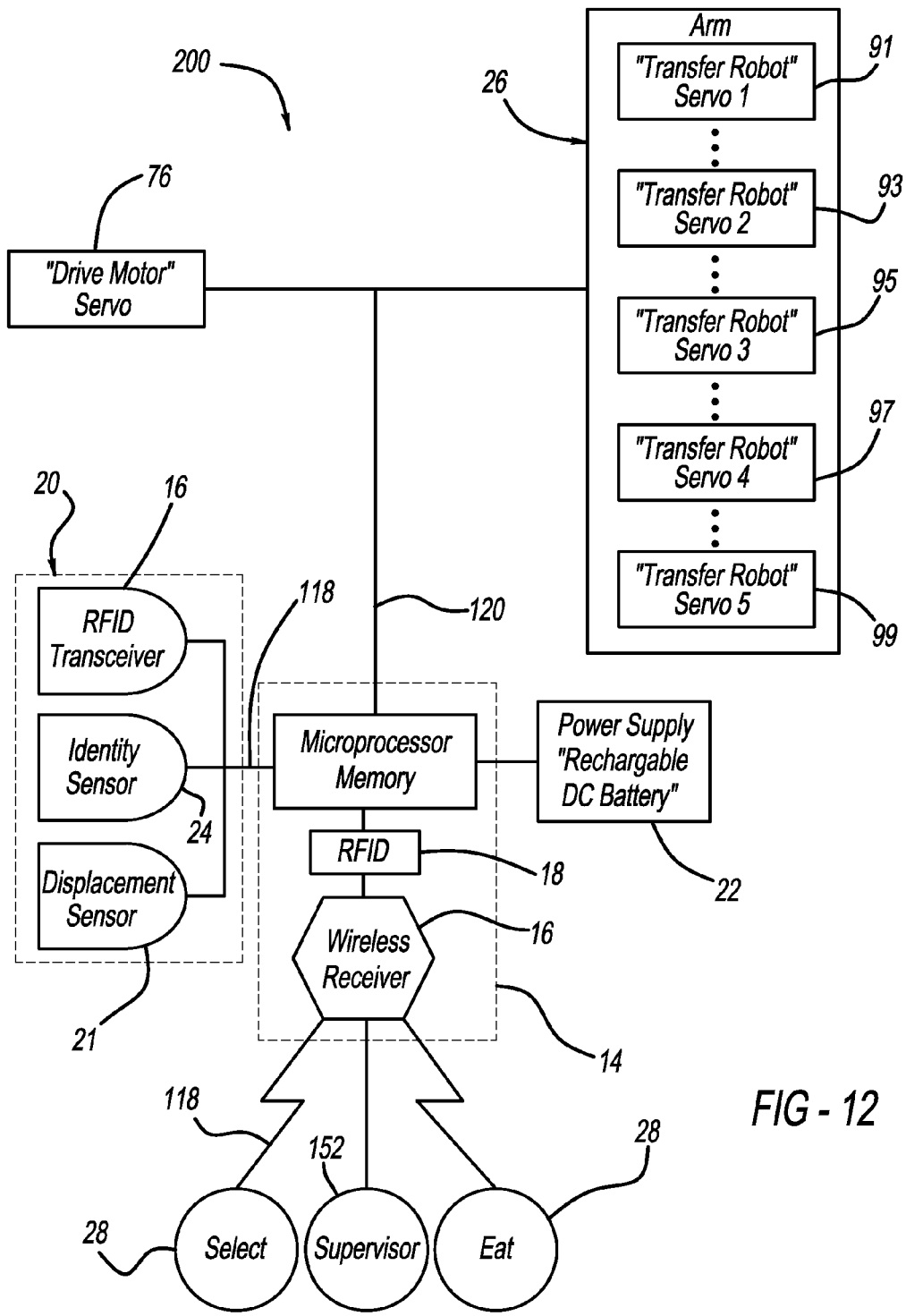
FIG. 12 is a schematic view of a system diagram for the self-feeding device of FIG. 1.

Referring to FIG. 12, a system diagram illustrating the operation of the self-feeding device 10 is illustrated at 200. The system 200 includes a controller 14 that controls operation of the feeding device 10 in a manner to be described. The controller 14 may include a microprocessor and a computer readable storage medium. The controller 14 may also include a software program that resides within the computer readable storage medium, i.e. memory, to control operation of the self-feeding device 10. The software program operatively controls the movement and position of the feed arm assembly 26 to both capture the food or liquid which is situated in one or more of the food compartments 54 or 116 and to subsequently present the captured food product (solid or liquid) to the user 12, i.e. user's mouth.

The controller 14 receives and processes an input signal 118, from various sources, such as from the user input device 28 or another sensing device 20. An output control signal 120 may be generated by the controller 14 to provide an instructional command to the feed arm assembly 26 or plate assembly 44. Either the input signal 118 or the output signal 120 may be communicated using any type of signal transmission protocol, such as wired, wireless, or a combination thereof via the signal transmission mechanism 16.

The user input device 28 is operable by the user 12 to communicate the user's intent to the controller 14. For example, the user 12 may communicate a food compartment selection, a utensil selection or that the meal is complete. Various types of user input devices 28 may be utilized, depending on the needs and accommodations of the user 12. The user input device 28 may be a control such as a motion sensor, a button, voice activation source, physical movement activation source, a neural signal, or the like. With respect to a neural signal, a neural control protocol may be utilized with the self-feeding device 10 for converting a neural input signal (e.g., the user's thoughts) generated by the foregoing sensors into neural input signal to the controller 14. Accordingly, depending upon the nature of the user's physical ability, the self-feeding device 10 may be easily operated by a user 12. The determination of what type of activation mechanism will be employed may be selected in part based upon the nature of the user's physical abilities.

Figure 11A:
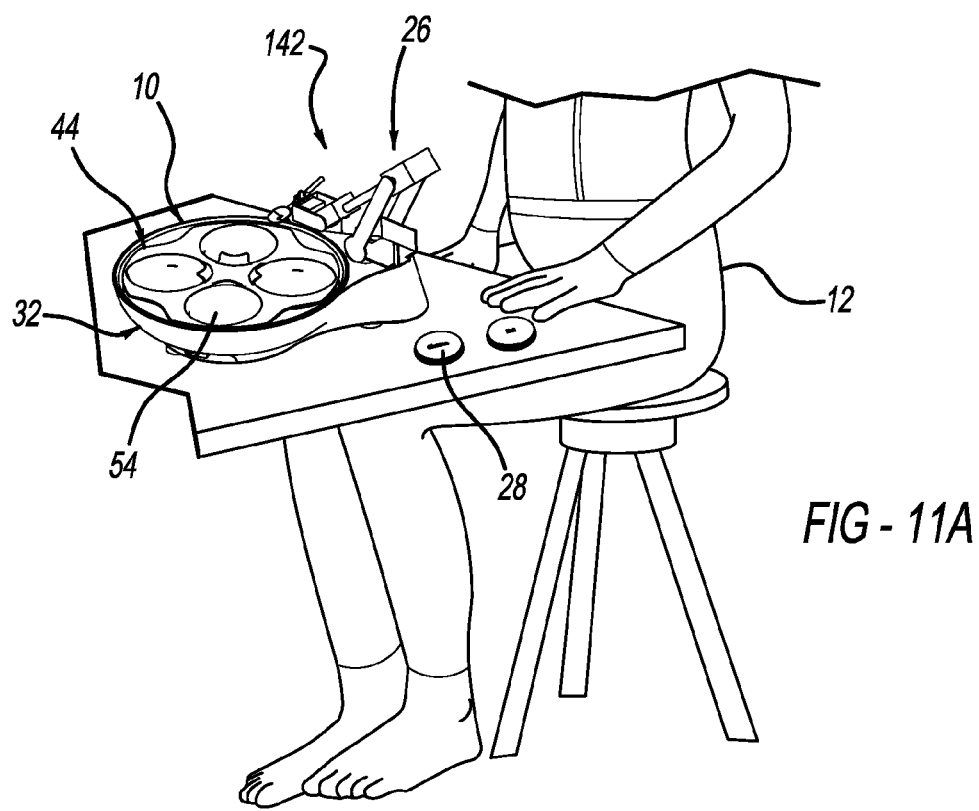
FIG. 11a is an enlarged view illustrating an input device for operating the self-feeding device of FIG. 1.
Figure 11B:
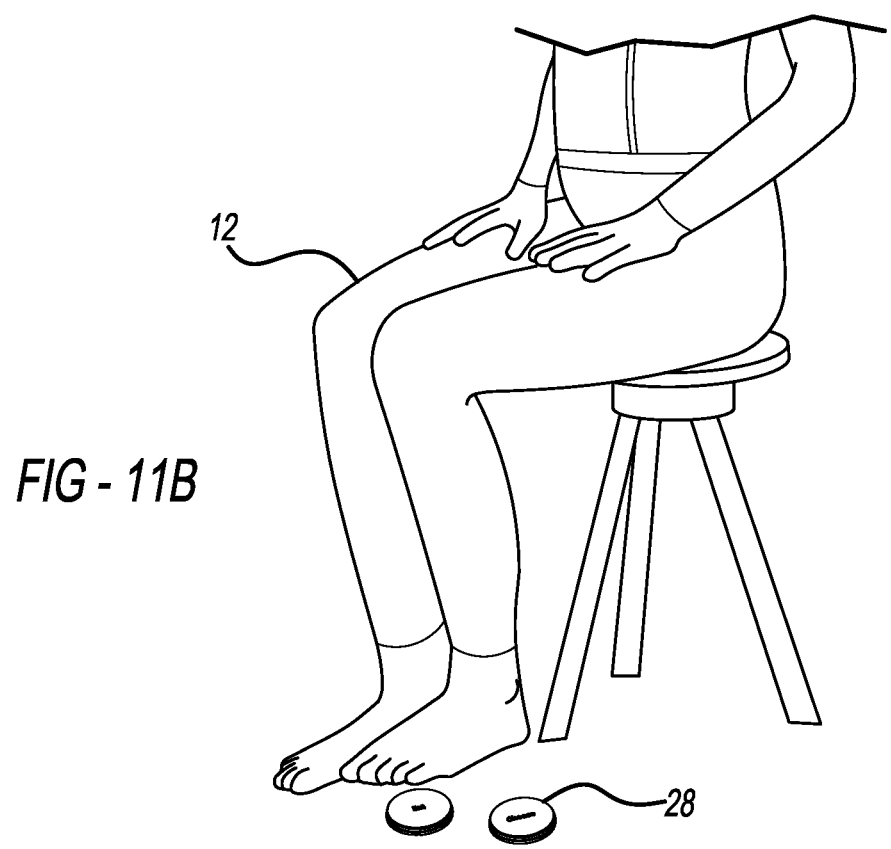
FIG. 11b is another enlarged view illustrating another example of an input device for operating the self-feeding device of FIG. 1.

The user input device 28 may communicate a desired function of the user, such as a "SELECT" function or an "eat" function. The user input device 28 may be easily actuated by a user 12 to control the movement of the feed arm assembly 26 as shown in FIGS. 11a and 11b. In addition, the user input device may be conveniently placed depending on user accommodations. As an example, a control may be placed in a location where the user has mobility (e.g., on the floor to be actuated by the user's feet, on a table to be actuated by a user's arms, or the like). In another example, the user input device 28 may be a pressure sensitive pad positioned in a location where the user 12 has some movement in order to exert pressure to control the operation of the feeding device (e.g., foot pads, elbow pads, micro switches etc.). Similarly, various other mechanical, electrical, or neural devices may be attached to the user's body in an area where the user 12 has some type of motor and/or neural control to convey the intended signal. The user input device 28 may include an integral signal transmission mechanism 16 as previously described.

The signal transmission device 16 is operatively in communication with the controller 14 via a signal transmission protocol, and such signal transmission protocol between the signaling device and the controller 14 may be wired or wireless or the like. In an example, the signal transmission device 16 may be a receiver, transmitter or a transceiver capable of receiving or transmitting a signal respectively. An example of a wireless receiver, transmitter or transceiver is an RFID communication protocol, although other types of communication protocols are contemplated, and the selection is non-limiting.

The system 10 may also include various types of sensing devices 20 depending on the feature. For example, a displacement sensor 21 may be used to sense a position of the user's mouth in order to intake the food item and transmits a corresponding input signal 118 to the controller 14 via a signal transmission mechanism 16. The self-feeding device 10 may use the user's mouth position to adaptively learn the food intake position of the particular user 12, i.e. the user's mouth, and remember this position so as to automatically position the feed arm assembly to feed the particular user 12. An example of a sensing device 20 may include a first transducer situated at the end of the feed arm assembly 26 near the feeding utensil 110. The user may have a second transducer located near user's mouth to properly position the feeding utensil with respect to the user's mouth. In an example, the second transducer may be affixed to the user 12 i.e. to the bottom of their chin or elsewhere to allow the feed arm assembly 26 to be properly positioned with respect to the user's mouth. The first transducer and second transducer may send a signal to a signal transmission mechanism 16 associated with the controller. As described, the signal transmission device 16 may be an RFID transceiver that advantageously provides greater accuracy regarding the positioning of the feed arm assembly 26 with respect to the food item included in the food compartment and the user's mouth. Thus, the second RFID transceiver located on the user 12 transmits an input signal 118 indicating the position of the user's mouth to the RFID transceiver 16 located in the feeding device. The controller 14 processes the input signal to establish the location of the user's mouth, and the location of the user's mouth is transmitted to the feed arm assembly 26 as an output signal 120.

The feeding device 10 may include an identity sensor 24 that senses the identity of the user 12, and adaptively controls the feed arm assembly 26 based on information learned regarding the user 12. The identity sensor 24 may also include a signal transmission mechanism 16 for communicating with the controller 14. The information regarding the user may be stored in a memory associated with the feeding device controller, or in a remote controller 140. Referring back to FIG. 2, the remote controller 140 may be a separate computer that is in communication with the feeding device 10. In an institutional setting, the remote computer 140 may be operated by an individual such as a supervisor 150. The remote computer 140 may be in communication with a plurality of feeding devices 10, and provides personalized control of each device.

The system 200 may include other components that are conventionally known in the art. For example, the system may include additional electrical and mechanical features such as displacement sensors, weight sensors, force feedback sensor, network components, or RFID transceivers. Other examples of conventional components include an electronics board, a wireless controller receiver, or a wiring harness. The wiring harness of the computer assembly connects the aforementioned electronics to a power source 22 or a power switch. The system receives power from the power source in order to operate the system components.

Figure 13:
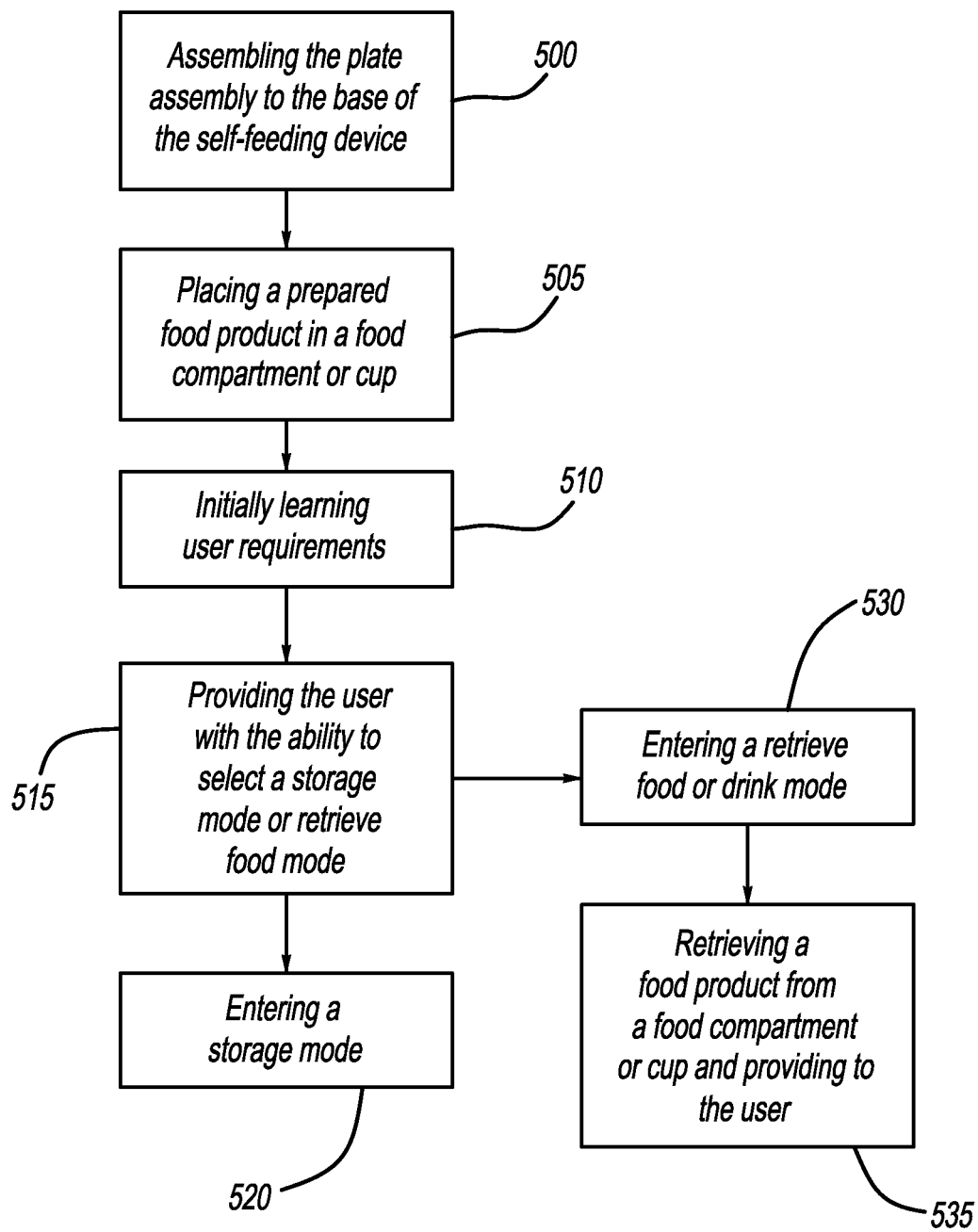
FIG. 13 is a flowchart illustrating a method of using the self-feeding device of FIG. 1.
Figure 14:
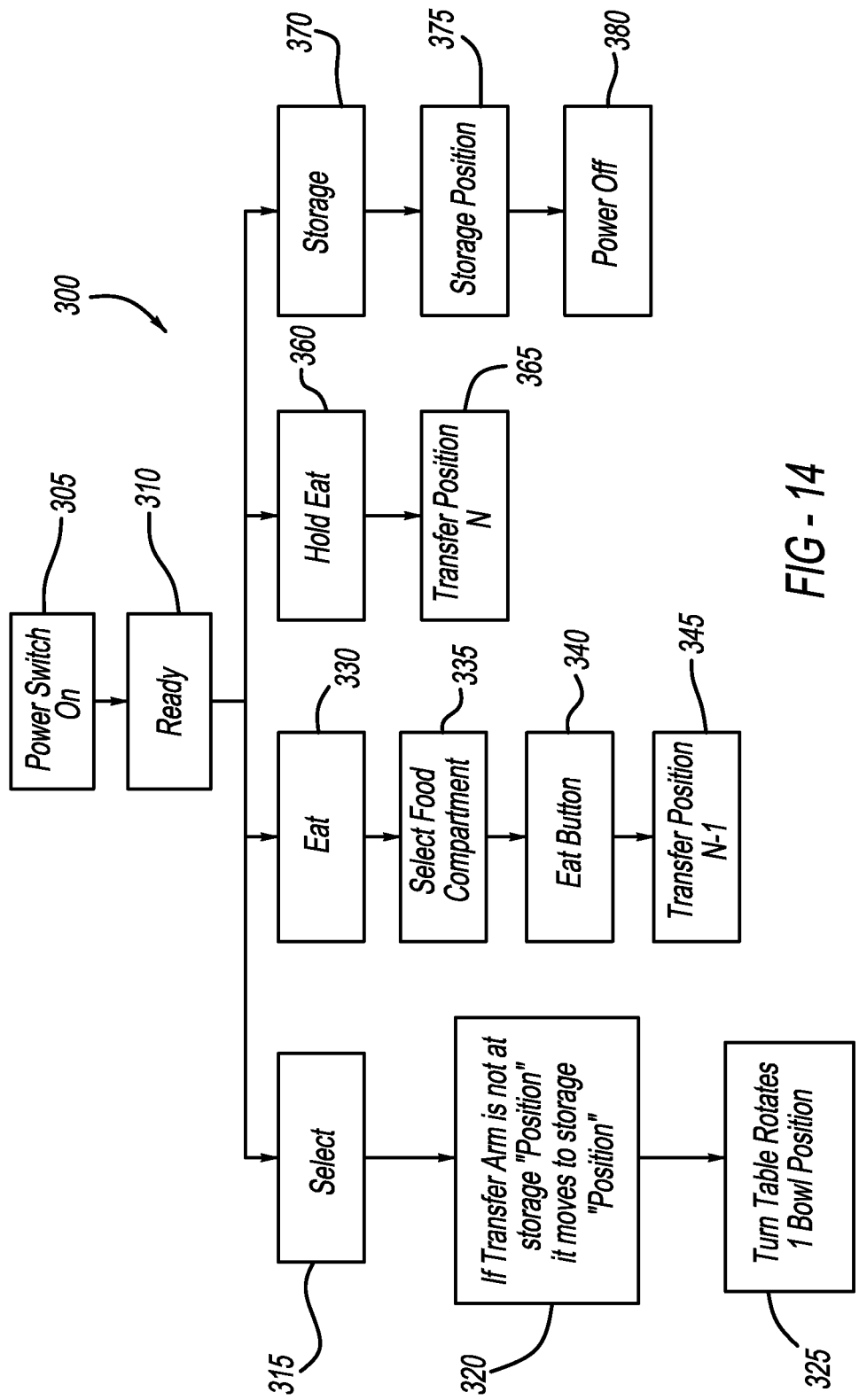
FIG. 14 is a schematic view illustrating user operation of the self-feeding device of FIG. 1.

Referring to FIGS. 13-15, a method of self-feeding a user 12 using the self-feeding device 10 is illustrated. It is anticipated that the method can be utilized with one user 12, or with multiple users. Each user 12 can independently select between several compartments of food, capture and transport a food item to their mouth or other food intake port.

The method begins in block 500 with the step of assembling the plate assembly 44 to the base 32 of the self-feeding device 10. In this example the plate assembly 44 is supported by the supports 72 formed in the housing 34. It should be appreciated that the self-feeding device 10 is portable and may be utilized in various environments beyond a conventional dining table through the use of the mounting element. For example, the self-feeding device 10 may be mounted to a hospital bed or other setting to accommodate the special needs of the user as previously described. The overall shape of the base assembly, is selectively determined to create a typical dining experience for the user. The shape may be a teardrop shape having a plate portion for food at the wider end and a mounting portion for a robotic arm at the narrow end.

The methodology advances to block 505 and includes the step of placing a prepared food item in a food compartment 54 associated with the plate assembly 44, or a separate food compartment adjacent thereto, such as a cup or glass 116. The food may be prepared according to the needs of the user 12, i.e. diced, pureed, mashed, cut or the like. In an example, the food capacity of each food compartment 54 may be customized depending on the nutritional requirements of the user 12. The fill line 60 helps prevent overfilling of the food compartment 54.

The methodology advances to block 510 and includes the step of initially learning user 112 requirements. For example, initial user requirements may be programmed into the controller associated with the feeding device or a remote controller, such as via prompts in a LEARN mode. Alternatively, user requirements may be maintained within a remote server 140 associated with the controller 14 and subsequently retrieved. The feeding device 10 may have an input device, such as a screen, or control or the like. The input device may be an LED or LCD screen with buttons for digital input, a touch screen, or the like. Each individual using the self-feeding device may create a profile containing their personal ergonomic setting. These settings may include information such as: Transfer Robot lift height, horizontal travel and angular rotation. Alternatively, user requirements may include user food sequence preference, predetermined feeding rates, height and location of user intake, such as user mouth or feeding tube by way of example. For example, the location of the user's mouth 12 may be selectively determined using the sensing device 20 associated with the feed arm assembly and communicated to the controller 14 via the RFID transceiver. In an example of a returning user 12, the user 12 is identified by the system, and specific user parameters may be retrieved and the feeding device calibrated to the user's needs.

The methodology advances to block 515 and the user 12 is thereafter provided with the ability to selectively actuate the self-feeding device 10 via the user input device 28. For example, the user may access various modes that provide a specific function, such as to select a food compartment 54 or to retrieve a food item and to deliver directly to the mouth of the user as desired.

If the user 12 selects a STORAGE mode, the methodology advances to block 520 and the feed arm assembly 26 is not actuated, and feeding is not available. The STORAGE mode may prevent accidental or unintended operation of the self-feeding device 10. In the STORAGE mode, the plate assembly 44 may be easily disengaged from the base 32, and may be easily stored, cleaned, and prepared with all other dishware in various settings, including: an institutional cafeteria, private home, and the like. The plate assembly 44 may be made from a dishwasher safe material. It should be appreciated, additional components of the self-feeding device 10 such as a feed utensil 110 and beverage container 116 is similarly dishwasher safe. Referring to FIG. 15a, the feed arm assembly 26 is located in a storage position as shown at 142. In this example, the feed arm assembly 26 is in a retracted position in the storage mode, but may still provide access to the food compartment 54. If the power switch is on, or in between bites, the STORAGE mode may include a "READY" feature.

Figure 15B:
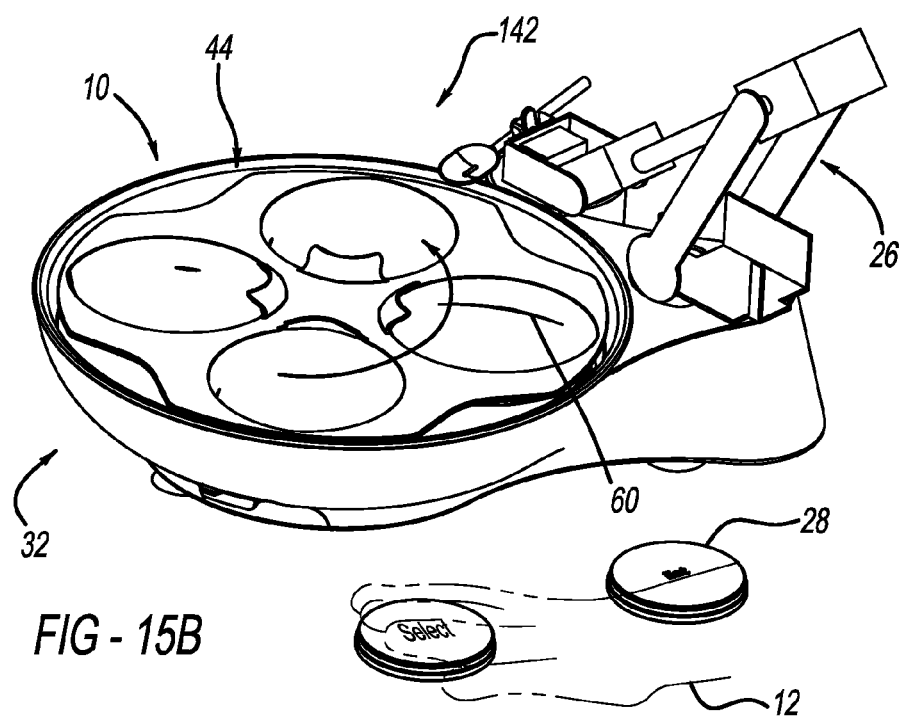
FIG. 15b is an elevational view illustrating the select food compartment mode of the self-feeding device of FIG. 1.

Returning back to block 515 and if the user 12 selects a RETRIEVE food mode, the methodology advances to block 530 and selects a food compartment. For example, the user 12 may activate an EAT control 28 to send an input signal 118 to the controller 14 requesting that the plate position mechanism 46 be actuated to rotate the plate assembly 44 so that the selected food compartment 54 is accessible to the feed arm assembly 26. Referring to FIG. 15b, the user may activate the plate assembly 44 using the user input device so that the plate assembly 44 is rotated to orient the selected the food product as shown at 142. Alternatively, the feed arm assembly 26 may be moved to access the selected food compartment 54 as described below.

Figure 15C:
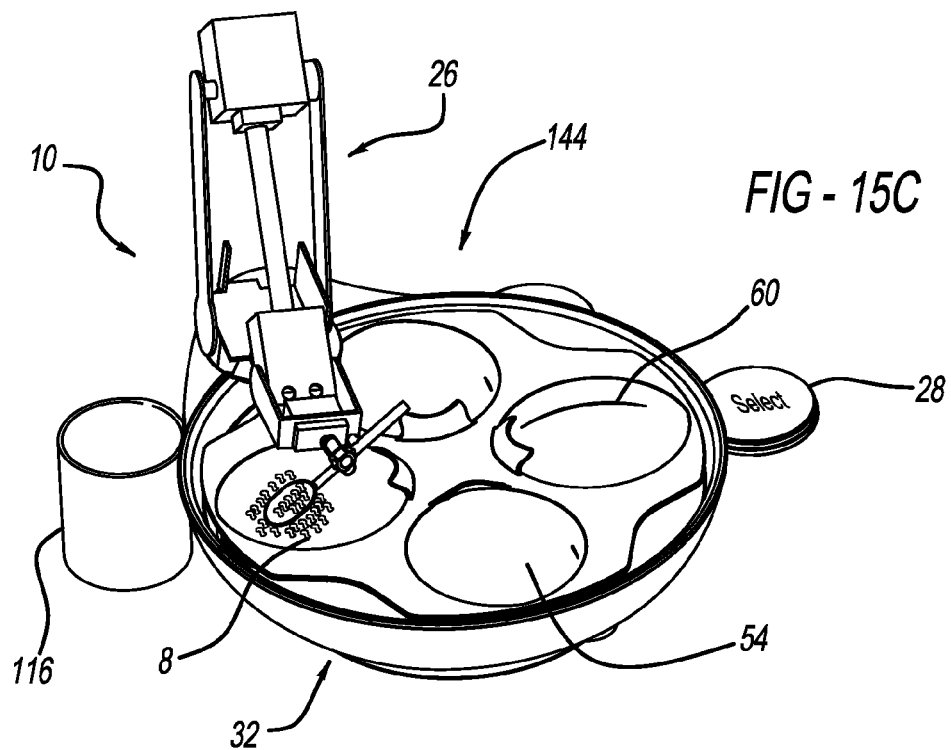
FIG. 15c is an elevational view illustrating a first transfer position of the feed arm assembly for the self-feeding device of FIG. 1.
Figure 15D:
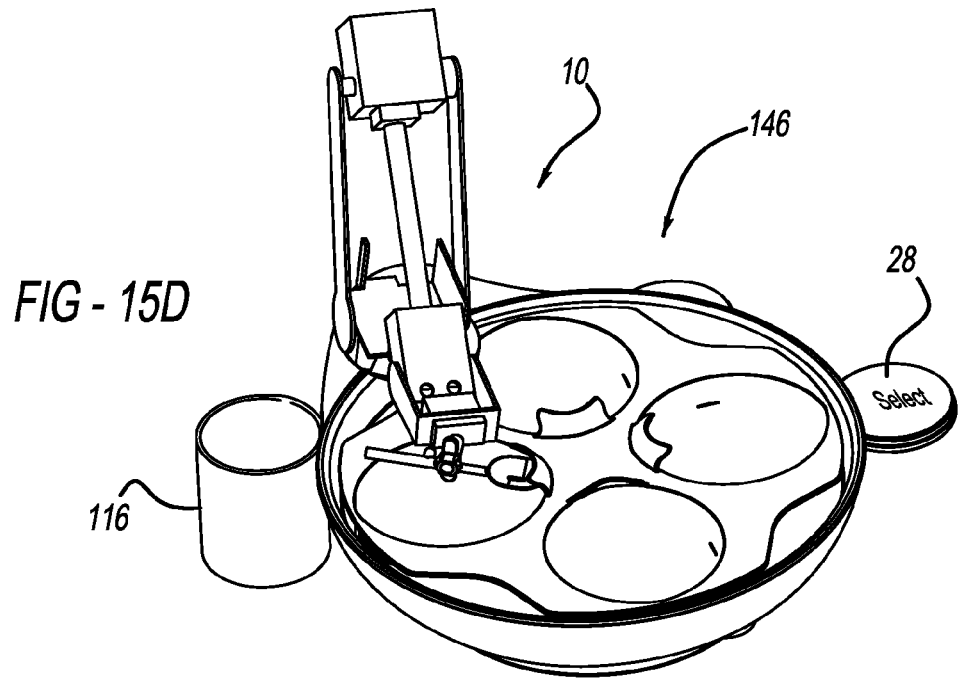
FIG. 15d is an elevational view illustrating a scooping motion of the feed arm assembly for the self-feeding device of FIG. 1.

The methodology advances to block 535 and the feed arm assembly 26 is instructed to retrieve the food item 8 from the selected food compartment 54 as shown in FIG. 15c at 144. The self-feeding device 10 automatically operates the feed arm assembly 26 to position the feeding utensil 110 with respect to the selected food compartment 54, and retrieves the food item 8 from the selected food compartment 54 using the feeding utensil 110. For example, the feed arm assembly may be actuated so that the feeding utensil 110 may scoop, or stab or otherwise position the food item 8 on the feeding utensil 110. The feed arm assembly 26 may scrape the feeding utensil 110 along the tab 58 as shown at 146 of FIG. 15d to avoid excess food on the feeding utensil 110. The feed arm assembly then transfers the selected food item to the user 12 such that the utensil 110 is within a predetermined distance from the user 12, i.e. as close to the users mouth as comfortable for the user to obtain the food from the utensil 110. For example, the user 12 may wear a sensing device 20 having a RFID transceiver 16 or the like, (such as a necklace or band-aide like patch under the chin, or on the chest or neck), while the self-feeding device 10 may contain a corresponding RFID transceiver 16 in communication with the controller 14. The controller 14 sends the feed arm assembly 26 an output signal representative of a distance or the coordinates which are closest to the RFID tag 20 worn by the user. During the retrieval and transfer of the selected food item, the feed arm assembly 26 is actuated by the actuators to pivot or articulate about each of the respective pivot axis associated with the arms of the feed arm assembly 26 to replicate the motion of a human arm while eating. The feed arm assembly 26 may return to a standby position after the user removes the food item from the utensil.

If the user selects to take a drink, the feed arm assembly 26 is actuated, to position the open or straw end of the combined spoon and straw feeding utensil 124 in the user's mouth, and the user draws the liquid up through the tube 132 and the straw and into the user's mouth.

The order of the above described steps is for illustrative purposes, and it is contemplated that the order of the steps may be varied within the scope of this innovation.

Advantageously, the self-feeding device 10 is not limited to a single user 12, and any user 12 may simply sit down and use the device 10. The feeding device 10 adapts to and learns the identity of the user, i.e. via the identity sensor 24 or the like. In such an example, there will be no need for storing personal ergonomic settings. Further, if the device 10 is used in multiple locations, where table height, chair height and position differ, the feed arm assembly 26 may automatically accommodate those differences. The self-feeding device 10 may also be used in both a home and institutional setting. It should be appreciated that although an RFID tag 20 is described in this example, other technologies which are utilized for position determination may be likewise employed.

Figure 16:
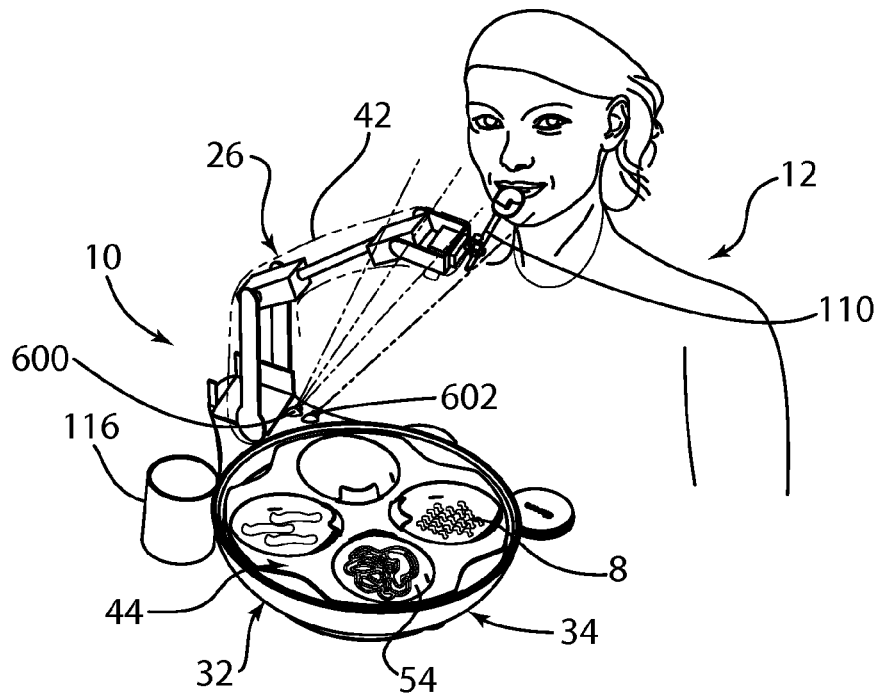
FIG. 16 is an elevational view of a self-feeding device according to another embodiment of the present invention.

FIG. 16 illustrates another example of a self-feeding device 10 including a mechanism for locating the user's 12 mouth or point of delivery whereby the information is used to deliver the utensil 110 to the user's 12 mouth. The mechanism includes a facial recognition sensor, including a camera 600, and a distance sensor 602 mounted on the base assembly 32. As set forth below, the facial recognition sensor, including the camera 600, cooperates with the distance sensor 602 to locate the user's 12 mouth, or point of delivery, wherein the information is used to direct the feed arm assembly 26 to deliver the utensil 110 to the user's 12 mouth. The facial recognition sensor can also be used to interpret movements or signals from the user 12 to control the function of the feeding device 10.

The camera 600 of the facial recognition sensor provides a two dimensional image of the user 12. Facial recognition algorithms that identify facial features by extracting landmarks, or features, from an image of the subject's face can be used to analyze and thereby determine the relative position, size, and/or shape of the eyes, nose, cheekbones, and jaw. Whereby the feeding device 10 uses the camera 600 to locate the user's 12 mouth. Given that the camera 600 provides a two-dimensional image, a distance sensor 602 determines the distance to the user's 12 mouth or point of delivery. Accordingly, the combination of the two dimensional image of the user's 12 face and the distance thereto provides a three-dimensional coordinate enabling the feed arm assembly 26 to transfer the feed utensil 110 to the user's 12 mouth.

While FIG. 16 shows the facial recognition sensor or camera 600 mounted to the base assembly 32 adjacent the feed arm assembly 26 it may be mounted on the surface of the feed device 10 in any number of positions on the feed device 10, or at another location independent of the feed device 10, with the location limited only by the facial recognition sensor or camera's 600 ability to continuously capture a two-dimensional image of a user 12 properly positioned in front of the feed device 10.

The distance sensor 602 may also be mounted to the base assembly 32 as illustrated in FIG. 16. The distance sensor 602, like the camera 600, can be mounted in a variety of positions limited only by the distance sensor's ability to measure or determine the distance from to the user's 12 mouth identified in the two dimensional image.

A specific example of facial recognition sensor and distance sensor used in the foregoing example is a color camera and an infrared optical sensor. There are many other types of distance sensors that could be used for this purpose including: inductive, ultrasonic, optical or other.

Figure 17:
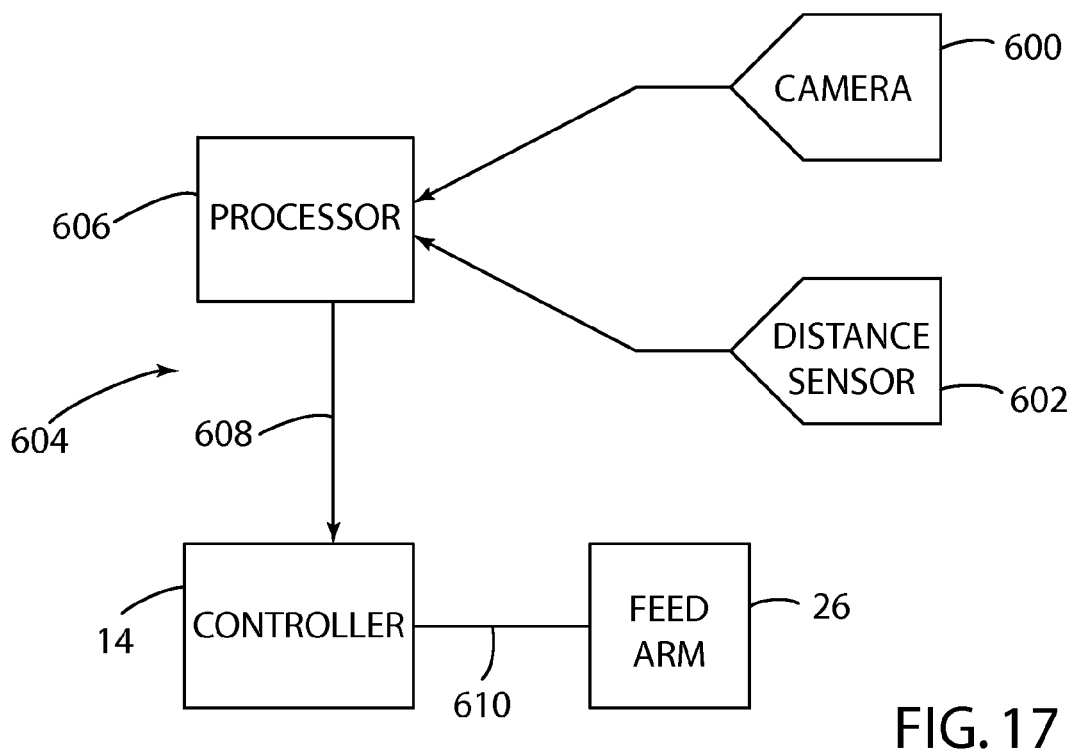
FIG. 17 is a schematic view of a system diagram for the self-feeding device of FIG. 16.

Referring to FIG. 17, a system illustrating another example operation of the feeding device 10, utilizing a mechanism for locating the user's 12 mouth or point of delivery, is illustrated at 604. In operation, the camera 600 continuously transmits a two-dimensional image to the processor 606. The image is analyzed by the facial recognition software resident on a processor 606 and correspondingly processes the two-dimensional image of the user's 12 to locate the two-dimensional coordinates of the user's 12 mouth. The distance sensor 602 is used to determine the distance to the user's 12 mouth and provides the processor 606 with that information. The processor 606 determines the three-dimensional coordinates of the user's 12 mouth and sends these three-dimensional coordinates via an output signal 608 to the controller 14. The controller 14, which includes a software program that resides within a computer readable storage medium, i.e. memory, defines these three-dimensional coordinates as the user's mouth or point of delivery. Using an inverse kinematic process the controller 14, through appropriate software, generates and sends a control signal 610 to the feed arm assembly 26 to actuate the servo motors of the feed arm assembly 26 to move the utensil 110 to the three-dimensional coordinates and correspondingly delivering the utensil 110 to the user's 12 mouth or point of delivery.

Although, the system 604 discloses use of a separate processor 606 and controller 14 it is possible to combine the processor 606 and controller 14 into a single unit or controller that captures all the data, makes the necessary calculations and controls movement of the feed arm assembly 26. The facial recognition sensor, including the camera 600, and the distance sensor 602 continuously transmit information to the processor 606 whereby the processor 606 continuously recalculates the location of the user's 12 mouth or point of delivery. The location of the user's 12 mouth or point of delivery is continuously sent the output signal 608 to the controller 14 which recalculates the control signal 610 sent to the feed arm assembly 26 such that the feed arm assembly 26 moves in accordance with a change in the location of the user's mouth or point of delivery.

Figure 18:
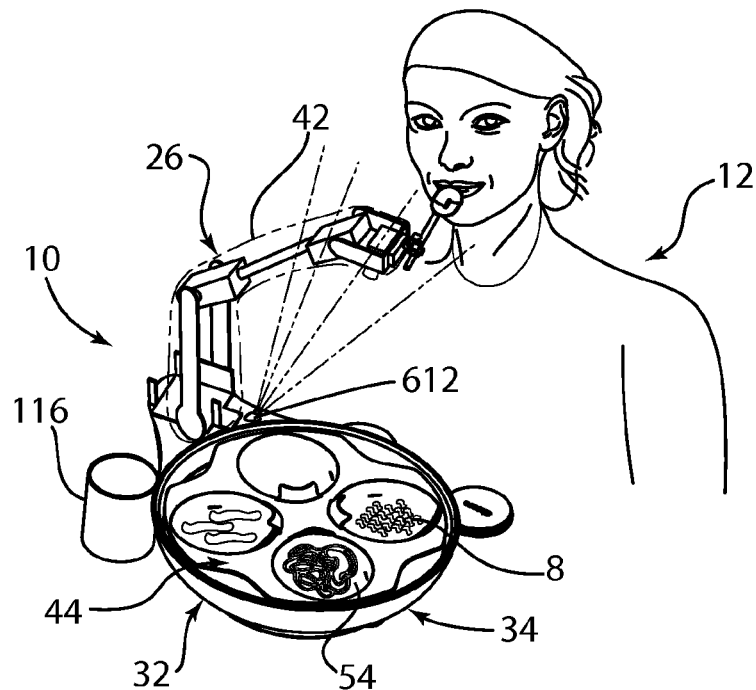
FIG. 18 is an elevational view of a self-feeding device according to another embodiment of the present invention.

FIG. 18 illustrates another example of a self-feeding device 10 including a mechanism for locating the user's 12 mouth or point of delivery whereby the information is used to deliver the utensil 110 to the user's 12 mouth. The mechanism includes a facial recognition sensor, including a stereo camera 612 mounted on the base assembly 32. As set forth herein a stereo camera is a camera using two or more lenses with a separate image sensor for each lens allowing the camera to simulate human binocular vision and giving it the ability to capture three-dimensional images. Accordingly, the stereo camera 612 is used to locate the user's mouth or point of delivery wherein the information is used to direct the feed arm assembly 26 to deliver the utensil 110 to the user's 12 mouth. The facial recognition sensor can also be used to interpret movements or signals from the user 12 to control the function of the feeding device 10.

While FIG. 18 shows the facial recognition stereo camera 612 mounted to the base assembly 32 adjacent the feed arm assembly 26 it may be mounted on the surface of the feed device 10 in any number of positions on the feed device 10, or at another location independent of the feed device 10, with the location limited only by the facial recognition sensor or camera's 612 ability to continuously capture a three-dimensional image of a user 12 properly positioned in front of the feed device 10.

The stereo camera 612 of the facial recognition sensor provides a three dimensional image of the user 12. Facial recognition algorithms that identify facial features by extracting landmarks, or features, from an image of the subject's face can be used to analyze and thereby determine the relative position, size, and/or shape of the eyes, nose, cheekbones, and jaw. With knowledge of the camera's intrinsic calibration parameters, a range image can be converted into a point cloud; specifically, the stereo camera 612 captures images of the user 12 from multiple viewpoints to create three-dimensional point clouds. A point cloud is a set of points in three-dimensions.

Whereby the feeding device 10 uses the stereo camera 612 to locate the user's 12 mouth. Given that the stereo camera 612 provides a three-dimensional image, a distance sensor is not required. Accordingly, the stereo camera 612 provides a three-dimensional coordinate enabling the feed arm assembly 26 to transfer the feed utensil 110 to the user's 12 mouth.

Figure 19:
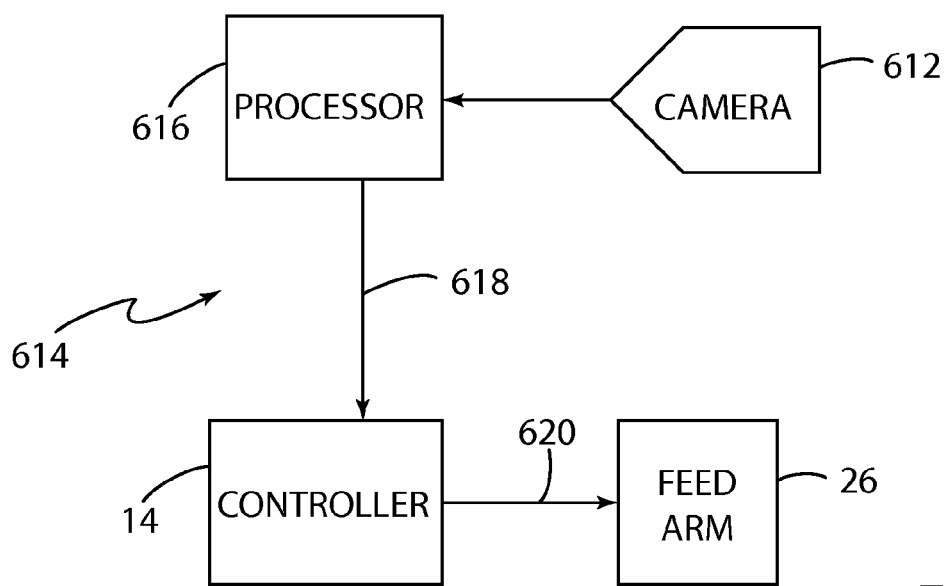
FIG. 19 is a schematic view of a system diagram for the self-feeding device of FIG. 18.

Referring to FIG. 19, a system illustrating another example operation of the feeding device 10, utilizing a mechanism for locating the user's 12 mouth or point of delivery, is illustrated at 614. In operation, the stereo camera 612 continuously transmits a three-dimensional image to the processor 616. The image is analyzed by the facial recognition software resident on a processor 616 and correspondingly processes the three-dimensional point cloud corresponding to the user's 12 face to locate the three-dimensional coordinates of the user's 12 mouth. After the processor 616 determines the three-dimensional coordinates of the user's 12 mouth and sends these three-dimensional coordinates via an output signal 618 to the controller 14. The controller 14, which includes a software program that resides within a computer readable storage medium, i.e. memory, defines these three-dimensional coordinates as the user's mouth or point of delivery. Using an inverse kinematic process the controller 14, through appropriate software, generates and sends a control signal 620 to the feed arm assembly 26 to actuate the servo motors of the feed arm assembly 26 to move the utensil 110 to the three-dimensional coordinates and correspondingly delivering the utensil 110 to the user's 12 mouth or point of delivery.

Although, the system 614 discloses use of a separate processor 616 and controller 14 it is possible to combine the processor 616 and controller 14 into a single unit or controller that captures all the data, makes the necessary calculations and controls movement of the feed arm assembly 26. The facial recognition sensor, including the stereo camera 612, continuously transmits information to the processor 616 whereby the processor 616 continuously recalculates the location of the user's 12 mouth or point of delivery. The location of the user's 12 mouth or point of delivery is continuously sent the output signal 618 to the controller 14 which recalculates the control signal 620 sent to the feed arm assembly 26 such that the feed arm assembly 26 moves in accordance with a change in the location of the user's mouth or point of delivery.

Both the camera 600 and the stereo camera 612 can be used to interpret user commands. Specifically the stereo camera 612, camera 600, and if necessary distance sensor 602, can be used to sense the movements of the user's 12 face, or other parts of the body, and use them as an interface (input) to control the feeding device 10. These systems operate to monitor the user 12 for a pre-programmed facial or other body movement intended to control the functions of the feeding device 10. These movements can be interpreted by either the processor 606, 616 or controller 14 which then sends commands directing feeding device 10 to perform its intended functions.

Figure 20:
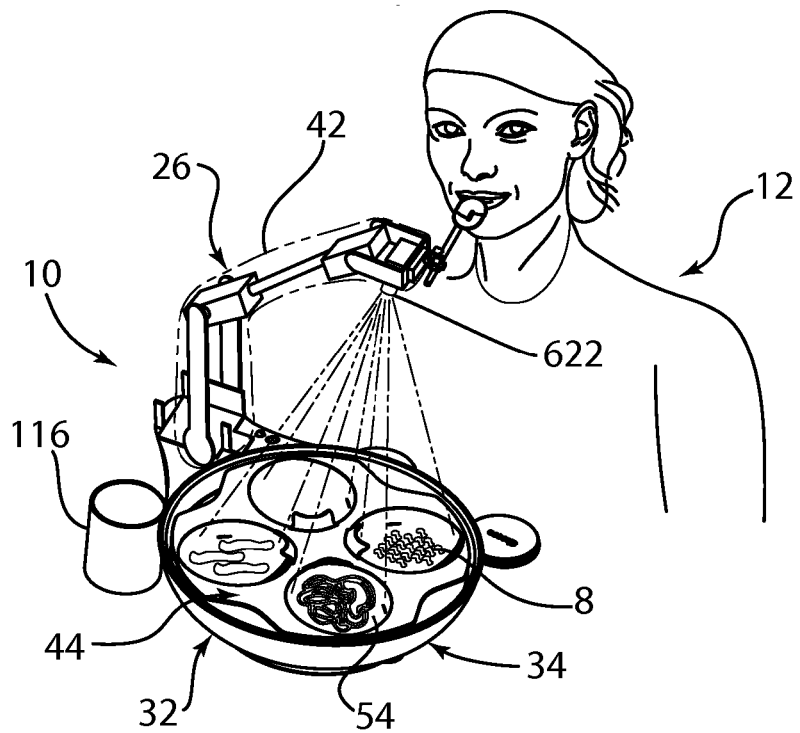
FIG. 20 is an elevational view of a self-feeding device according to another embodiment of the present invention.

FIG. 20 illustrates yet another example of the self-feeding device 10 wherein the feed arm assembly 26 may be equipped with a sensor 622, including a visual sensor such as a two-dimensional RGB camera or stereo camera, that enables the feed arm assembly 26 to accurately and precisely capture and image of the food from the food compartments 54, in addition the sensor 622 can also be used to capture an image of the liquid in a container or cup 116. In this case food compartment 54 and container or cup 116 are synonymous in that they both contain food whether in solid, semi-solid or liquid form. So while the food compartment 54 is identified as on example herein, the container or cup 116 containing liquids may be substituted for the food compartment 54 as the food compartment could also hold liquids. The sensor 622 is installed on the feed device 10 at a location where it can capture images of the contents located in each food compartment 54. In addition, as illustrated in FIG. 20, the sensor 622 can be attached to the feed arm assembly 26. Depending upon the type of sensor 622 used, at least one of the physical features, including color or shape, of the contents of the food compartment 54; i.e., the food located therein, are used to identify the position of the food within the food compartment 54 as well as the type of food in the food compartment 54.

Figure 21:
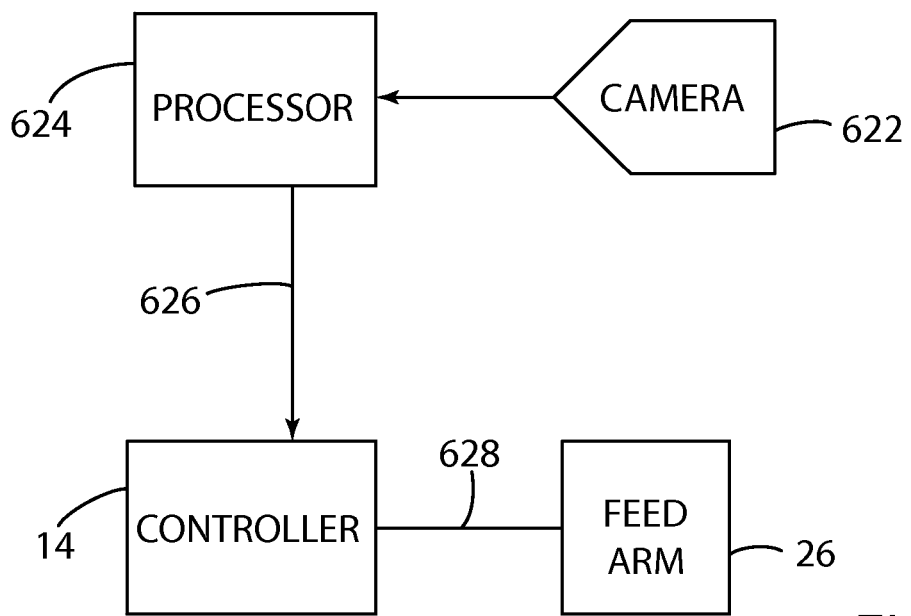
FIG. 21 is a schematic view of a system diagram for the self-feeding device of FIG. 20.

FIG. 21 illustrates a system diagram wherein the sensor 622 captures an image of the contents of the food compartments 54 and transmits a signal corresponding to the image to the processor 624. The processor 624 analyzes the image and sends an output signal 626 to the controller 14 containing the relevant positional information of the contents of the food compartment 54. The controller 14 based on the relevant positional information generating and sending an appropriate control signal 628 to the feed arm assembly 26 directing the feed arm assembly 26 to retrieve at least a portion of the contents of the food compartment 54. No matter where the contents are concentrated within each food compartment 54, the feed arm assembly 26 is directed by the output signal 626 of the processor 624 and controller 14 to effectively capture the contents contained within the food compartment 54.

Figure 22:
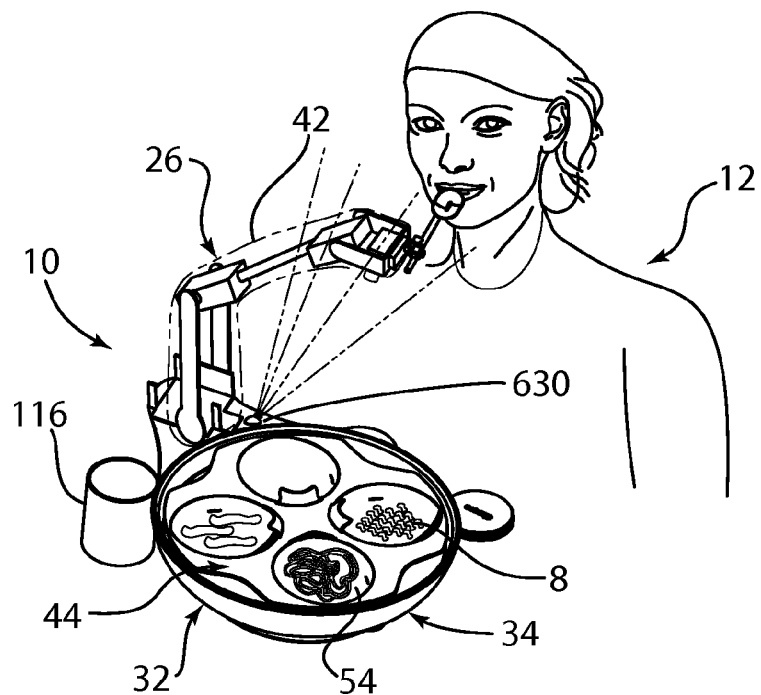
FIG. 22 is an elevational view of a self-feeding device according to another embodiment of the present invention.

FIG. 22 illustrates yet another example of a self-feeding device 10 equipped with a collision detection system 630, including a sensor 632 that detects any obstacles in the path of the feed arm assembly 26. The sensor 632 may include a stereo camera or may include a RBG camera and coupled with a distance sensor, for example and inductive, ultrasonic, optical or other type sensor, used to detect any obstacles in the path of the feed arm assembly 26. While shown located on the base assembly 32 of the self-feeding device 10 the sensor 632 can be located on the feed arm assembly 26 or any other suitable location whereby the sensor 632 can detect any object in the path of the feed arm assembly 26 when transferring food from the food compartment 54 to the user's 12 mouth. If the sensor 632 detects any object in the feed arm assembly 26 path, the feed arm assembly 26 immediately ceases movement thereby avoiding any collision or spillage. An alarm could also be sounded or a notice communicated to the caregiver that an obstruction is in the path of the feed arm assembly 26.

Figure 23:
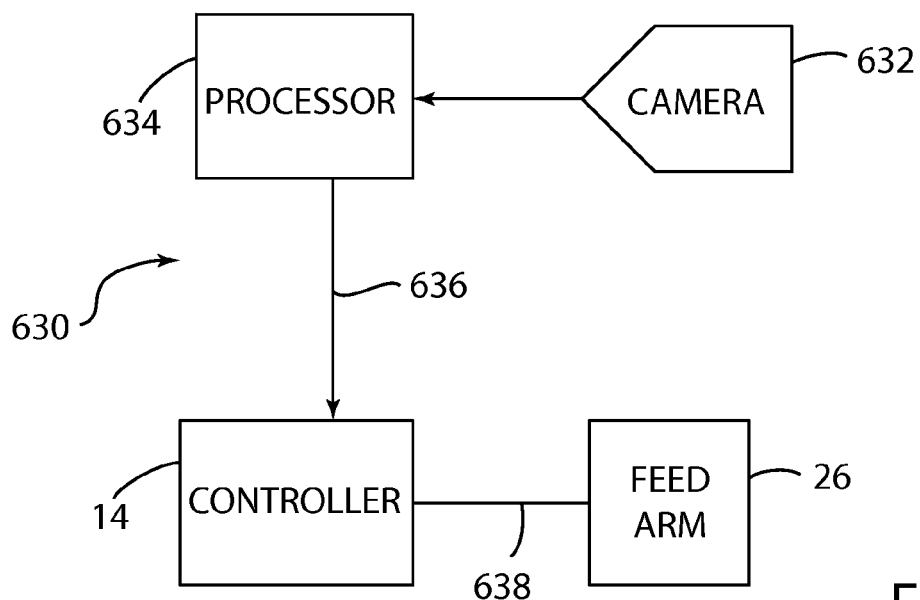
FIG. 23 is a schematic view of a system diagram for the self-feeding device of FIG. 22.

FIG. 23 illustrates collision detection system 630 wherein the sensor 632 upon detecting an object in the path of the feed arm assembly 26 sends a signal to the processor 634 indicating the presence of an object in the path of the feed arm assembly 26. The processor 634 may actuate an alarm or other notification to the caregiver regarding the presence of an object. In addition, the processor 634 generates and sends an output signal 636 through the controller 14 which correspondingly generates and sends a control signal 638 to the feed arm assembly directing the feed arm assembly 26 to abort its intended path and, as much as possible, move out of the path of any moving and interfering obstacle. After the obstruction is removed, the function of the feed arm assembly 26 would continue along its normal path.

Figure 24:
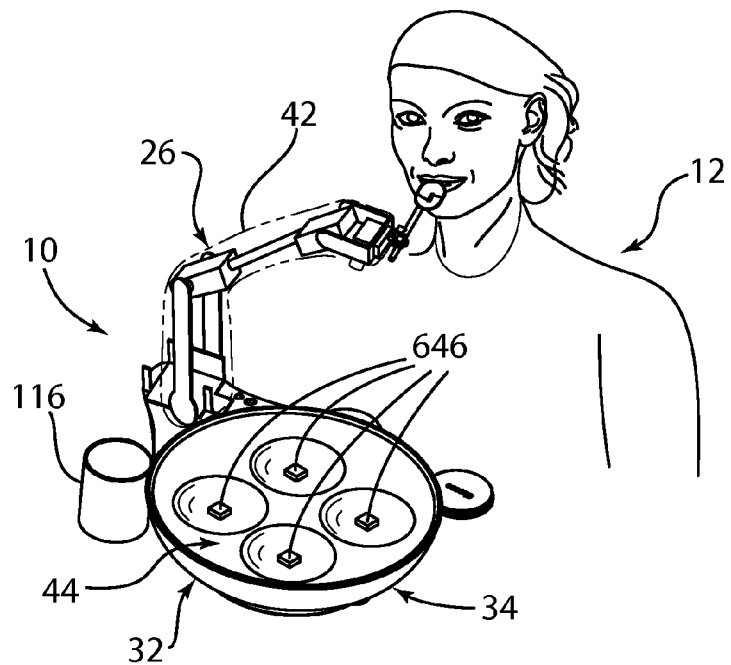
FIG. 24 is an elevational view of a self-feeding device according to another embodiment of the present invention.

FIG. 24 illustrates yet another example of a self-feeding device 26 equipped to gather and compile data regarding the user's eating and drinking experience, for example: when did they eat and drink; how long did they take to eat and drink; what did they eat and drink; and what quantity of food and drink was consumed and any other desired information. The self-feeding device 26 then generates reports or information based on the data and, as required or requested, sends such information or reports to a remote location; one example of a remote location may include a caregiver or supervisor 150 who may monitor multiple users 12 concurrently as shown in FIG. 2. Other examples include healthcare providers, institutional management, family, nutritionists or other interested parties as appropriate. Accordingly, as used herein remote location is broadly construed to mean a location other than the specific location of the individual.

Following are examples of two methods that may be used to gather information about the quantity of food and liquids and the corresponding calories consumed as well as other nutritional information. In the first method, the self-feeding device 10 is equipped with a sensing device or sensor 640 capable of identifying the type of food contained in the food compartment 54 and the approximate quantity of food in the food compartment 54. The sensing device or sensor 640 may include a visual sensor such as a two-dimensional RGB camera or stereo camera that captures an image of the contents of the food compartments 54 and the contents of the liquid container 116 and transmits a signal corresponding to the image to the processor 642 which utilizes a data base located in the processor memory or an external database 644 to identify the type and approximate quantity of food in the food compartment 54 and the type and quantity of liquid in the container. As set forth herein the term sensor is broadly used and may include multiple components capable of performing the various functions set forth herein. For example, a sensor may be a combined sensor capable of monitoring the weight, type of food and quantity of food in a food compartment 54 as well as the weight and quantity of liquid in the container 116.

Figure 25:
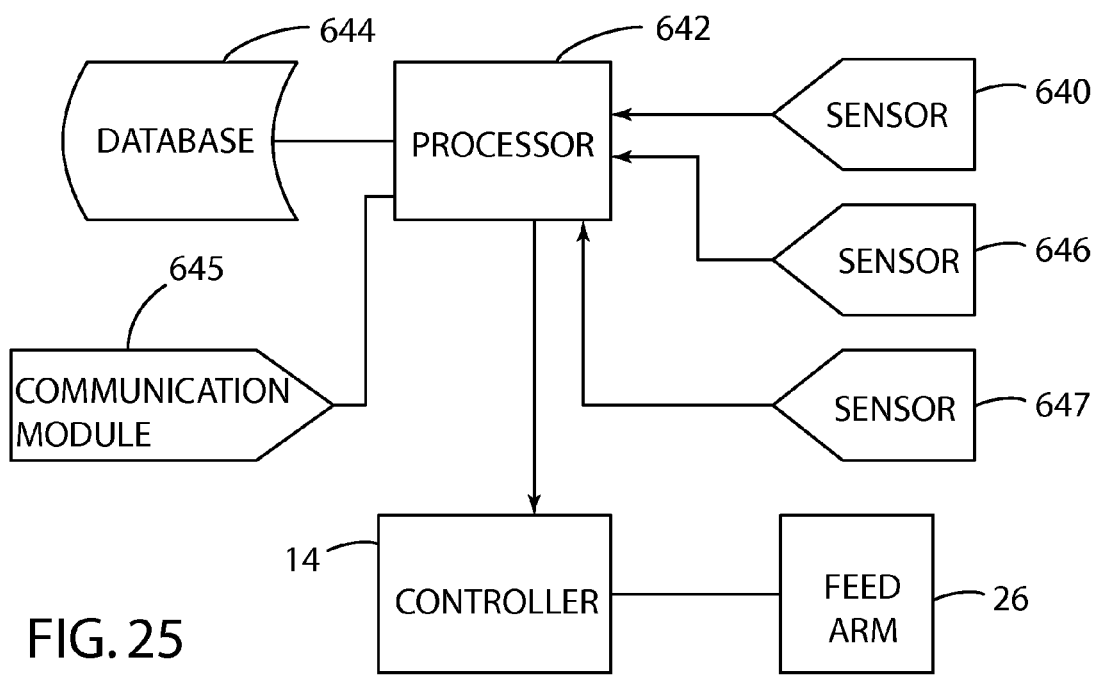
FIG. 25 is a schematic view of a system diagram for the self-feeding device of FIG. 24.

FIG. 25 illustrates a system for measuring and reporting food and liquid consumption and nutritional information of the food and liquid consumed by a user of the self-feeding device 10. At the beginning of a meal the sensor 640 captures images of the food in each food compartment 54. These images are used to define the volume of food and type of food in each food compartment 54. Given that the volume of the food compartment 54 is known, or can be determined prior to food being placed in the food compartment 54, the volume of food can be calculated based on the amount of food in the food compartment 54. For example, if the food compartment has a volume of 1 cup, that volume is then used to calculate the quantity of food. Further, gradient lines or other indicators can be included on the food compartment 54 to aid in determining the quantity of food consumed. Based the images received from the sensor 640 showing the quantity of food in the food compartments 54 at the beginning and end of each meal the processor 642 can calculate the quantity of food consumed. Similarly the sensor 640 can capture images of the liquid in the container 116. Given the volume of the container is known, or can be determined prior to the liquid being placed in the container 116, the volume of the liquid consumed can be calculated based on the liquid in the container at the beginning of the meal and the amount of liquid remaining in the container 116 at the end of the meal.

At the beginning of the meal, the images captured by the sensing device or sensor 640 are compared to a data base located in the processor memory or an external database 644 to determine the type of food contained in the food compartments 54 or container or cup 116. Next, the corresponding caloric density and nutritional value of the food types are retrieved from the database 644. Knowing the amount of food consumed and the food type, the processor 642 can calculate the calories consumed and relative nutritional value of the food consumed. In this method, photographs also can be taken of the food in each food compartment 54 and container or cup 116. These photographs can be stored and forwarded as part of the user's report. In addition, depending upon the requirements, the sensor 640 can also be used to provide real-time information or viewing by necessary or selected individuals as to the food in each food compartment 54 and container or cup 116.

In a second method, typically for use in institutional settings, the food compartments 54 in the plate are specifically designated for protein, starches, vegetables, salads, desserts, etc. and aid in food identification. Specifically, specific foods and amounts thereof are each placed in a designated food compartment 54 and liquids in the container or cup 116.

With the second method a sensor 646, for example a load cell or similar device such as a weight cell or electronic scale, is mounted under the food compartment 54 or under the placemat which will measure the weight of the food consumed. FIG. 24 illustrates one example of the location of the sensors 646, that is the sensor 646 are placed under the individual food compartments 54 wherein the food compartments 54 sit on the sensors 646. Similarly, weight sensors 646 can be placed under the drink container 116. Accordingly, the sensor 646 monitors the weight of the food located in the food compartment 54 and the drink located in the container 116 and transmits a corresponding signal related to the weight to the processor 642. In addition to monitoring the weight of the food and each individual food compartment 54, the self-feeding device 10 can also record the number of spoonsfuls of food consumed by the user 12 or the number of times the user takes a drink from the container 116 and correlate that with the weight of the food removed from the food compartment 54 or the weight removed from the container 116.

By placing specific food types in designated food compartments 54 the self-feeding device 10 is capable of calculating nutritional information including the approximate number of calories. As set forth above, the self-feeding device may access the database 644 to determine the caloric content and relative nutritional value of the food types contained in the bowls. Based on obtained weight data and the number of spoonfuls of food consumed by the user 12 to calculate the number of calories consumed and the nutritional value of the food consumed.

In both methods, the self-feeding device 10 compiles the calories consumed and nutritional information. This information, along with timing information and photographs can be compiled and using a communication device 645 capable of sending such information in both real-time or delayed through wired or wireless communications or other suitable means sent to a remote location as set forth above; for example, healthcare providers, institutional management, family, nutritionists or others as appropriate. In addition, a further example of the self-feeding device 10 includes a clock either separate or included in the processor 642 that operates to capture timing information relating to food consumption; including, the time of day when a user 12 ate, length of time between respective spoonfuls and the length of time it took the user 12 to eat.

Accordingly, the system is capable of using various types sensors, not limited to various cameras and load cells forth above, to determine the initial quantity of food in the food compartment, the quantity of food in the food compartment after the individual has ceased consuming the food, using these quantities to determine the quantity of food removed from the food compartment, monitoring the user or individual to determine whether the quantity of food removed from the food compartment was consumed by the user and thereafter calculating the nutritional value of the food consumed by the user. The entire process including the nutritional value of the food consumed by the user along with consumption rates and physical data of the user may be transmitted to a remote location including monitoring stations and other locations as set forth above. As used herein the sensors also monitor various parameters in the sense that they are able to watch or keep track of a specific parameter. Thus, both the load cell 646 and the cameras 612, 640 are examples of monitoring devices that may be used to monitor such things as the individual, the quantity of food consumed by the individual, the amount of food removed from the food compartment by the individual, the feeding process, operation of the self-feeding device 10 wherein such as images recorded by the respective cameras 612, 640 can be transmitted such that they can be viewed or watched at a remote location.

In addition, as set forth previously the self-feeding device 10 can be wirelessly equipped and gather data from a variety of sensors. One of the sensors 647 may be a physical condition sensor capable of monitoring a physical condition of the individual. For example, the sensors 647 may monitor physical data or parameters such as the condition of the individual including the individual's blood pressure, glucose levels, pulse, tidal carbon dioxide, oxygen level, heart rate, temperature, respiration rate and other biometric values. Such sensors 647 may be physically attached to the individual and provide information is to a wired or wireless interface to the processor or communication module. For example, a clip attached to an individual's finger or a pad placed on an individual's chest. In addition the sensors 647 may be separate or spaced from the individual and monitor the individual's physical data and provide information to the processor or communication module. For example an infrared thermometer. Further, system may incorporate or obtain data from existing physical sensors used with the individual. Data may in addition to such information, the processor 642 of the self-feeding device 10 may be equipped with a clock enabling the self-feeding device 10 to capture the time of day when an individual ate and the length of time it took the individual to eat. In both in institutional and home setting, a caregiver situated at a remote location may be equipped with a wireless tablet or other communication device that will receive information from the self-feeding device 10. Accordingly, the caregiver may monitor the pace at which the user is eating and the amount and nutritional value of the food and drink consumed by the user. Further, this will allow the caregiver the opportunity to intercede if the user is not consuming sufficient nutrition and liquids.

While the example set forth herein discloses a separate food compartment 54 and drink and/or liquid container 116, both the food compartment 54 and liquid container or cup 116 are used to contain a food which can be a liquid or solid. Accordingly as used herein the term eating also includes drinking; i.e., consuming a food regardless of whether the food is in a solid or liquid state. Further, illustrative examples addressing the food compartment 54 are also suitable for use with a container or cup 116 which is configured for holding a liquid instead of a solid. It should be understood that the present invention covers the method and system disclosed herein regardless of whether the food is in a liquid or solid state or the type of container or compartment it is located in.

Figure 26:
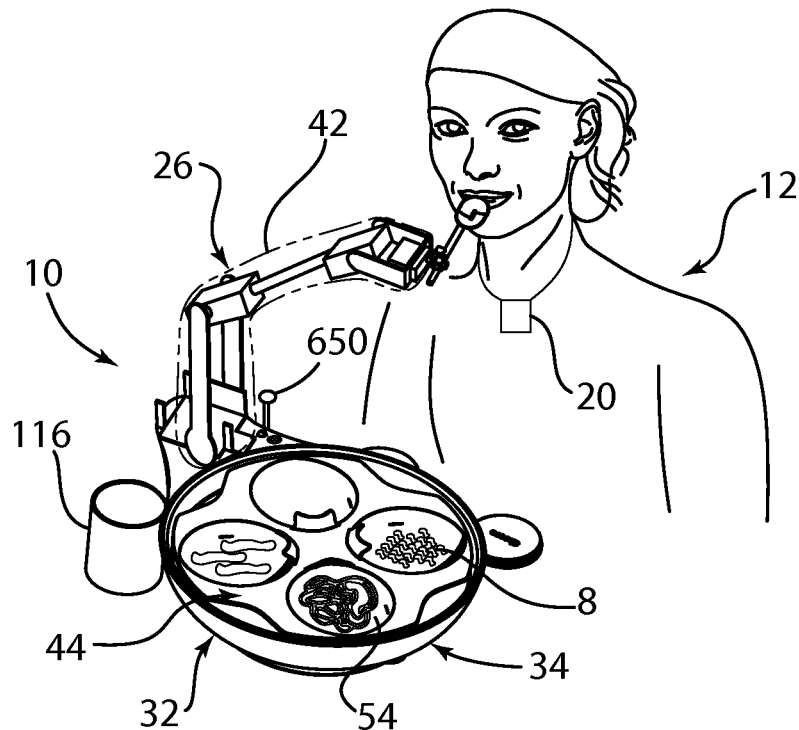
FIG. 26 is an elevational view of a self-feeding device according to another embodiment of the present invention.

FIG. 26 illustrates another example of a self-feeding device 10 including at least one indicator or alarm 650 for prompting a user to eat. Elderly people and others with certain conditions often take long pauses between each forkful or spoonful of food and as a result often do not consume sufficient calories. Further, the individuals may take long pauses between consuming liquids or don't consume a sufficient amount of liquid. These individuals often have to be reminded to continue to eat and drink or they suffer the risk of malnutrition or dehydration. As illustrated, the alarm 650 is mounted to the base assembly 32 or located elsewhere on the self-feeding device 10 including the feed arm assembly 26. In one configuration, the alarm 650 is located in view of the user 12. In another configuration or embodiment the alarm is located or configured to notify a caregiver. The alarm 650 can be a particular sound, flashing light, verbal warning, motion by the feed arm 26, vibrating wristband or any other wide variety of warnings that would alert the user 12 as well as the caregiver that the user 12 is no longer eating or drinking at a reasonable pace.

Figure 27:
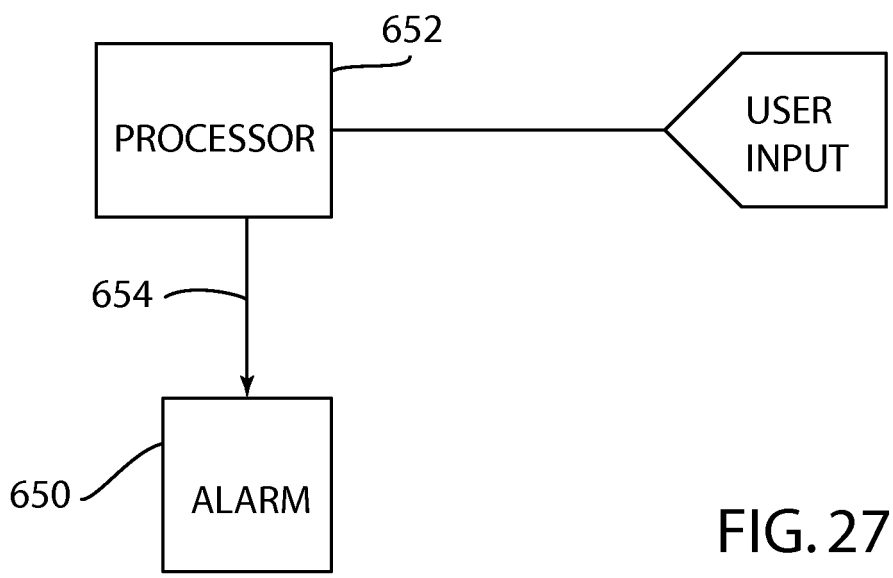
FIG. 27 is a schematic view of a system diagram for the self-feeding device of FIG. 26.

FIG. 27 illustrates another example of a system for operation of the self-feeding device 10 including a processor 652 with a built in clock capable of measuring the elapsed time between each spoonful of food or each drink; i.e., the processor 652 of the self-feeding device 10 will measure the time between input commands or cycles, for example "eat" or "drink" commands. If the duration of the elapsed time between a command or cycles goes beyond some time limit set by the caregiver, the processor 652 will send an alarm signal 654 to activate or turn on the alarm 650 to notify both the user and any other individual or caregiver of the delay.

In yet another example of multiple users 12, a caregiver or supervisor 150 may monitor multiple users 12 concurrently as shown in FIG. 2. The system may perform additional functions related to gathering a variety of information, such as monitoring food intake of each user 12 (ex. utilizing a load cell to measure the amount of food or liquid which is consumed) and sending such information over a network to another entity, which may include: a nursing station, physician, nutritionist or server or the like. Additionally, the supervisor 150 may control operation of each individual self-feeding device 10. For example, the supervisor may likewise have a supervisor input device 152 with a signal transmission mechanism 16 such as an RFID transceiver, that will prohibit operation of the devices 10 unless a supervisor's RFID tag (e.g., situated as a wristband, necklace, card, etc.) is within a predetermined range of one or more of the devices 10. It should be appreciated that RFID or other technology may also be utilized to ensure that a caregiver or supervisor 150 is located proximate to the user 12 with the functionality of the self-feeding device 10 being inoperable unless the caregiver is located within a predetermined distance of the user 12, as an additional safety feature.

Referring back to FIG. 14, operation of the self-feeding device 10 by the user 12 is further illustrated as shown at 300. The user 12 selectively operates the user input mechanism 28 to send the appropriate input signal 118 to the controller 14, the signal is processed as previously described, and an output signal 120 is transmitted to accomplish the desired action. At step 305, the user or caregiver turns on the self-feeding device 10 by connecting a power source, or in this example moving a power switch to an "on" position.

At step 310, the self-feeding device 10 is in a READY position and the feed arm assembly 26 may be in a storage position 142. The READY position may be a feature of the STORAGE mode as previously described. Further, the READY mode may include a LEARN feature whereby the user may be identified using the identity sensor 24. In addition, the location of the user's moth may be determined using the displacement sensor 20 and a corresponding input signal is set to the controller 14 associated with the self-feeding device 10. The user may initiate a command while in the READY position using the user input device 28.

If the user 12 chooses a command by activating the user input device 28 i.e. by depressing the SELECT control, the user may select a food compartment. At step 320, the user may actuate the SELECT control and feed arm assembly may be moved to the storage position. At step 325, the user may actuate the SELECT control and the plate assembly or feed arm assembly may be rotated to offer access to the selected food compartment 54.

Advancing to step 330, the user may select a RETRIEVE mode, such as by actuating the EAT control once by the user 12. The plate assembly may be moved to an initial position as shown at block 335 and the user may select a food compartment to obtain the food product from. At step 340, the user may actuate the EAT control again to pick up the food item from the food compartment. At step 345 the feed arm assembly 26 may be actuated through a first transfer position and subsequent (n−1) transfer positions to replicate the motion of the human arm. Thus, the feed arm assembly is articulated to acquire the food item 8 on the feeding utensil 110 and to move the food into the required proximity of the mouth of the user.

Advancing to step 360, the user may select a RELEASE function, whereby the food product is accessible by the user. The RELEASE function may be a feature of the RETRIEVE mode. For example, the user 12 may depress and hold the EAT control to initiate the RELEASE function. At step 365, the feed arm assembly 26 moves the feed utensil to place the food item 8 (i.e. liquid or solid) in the user's mouth, such as by articulating the feed utensil at a nth or in this example a fifth transfer position, to release the food item into the mouth of the user.

Advancing to step 370, if a STORAGE mode is desired, such as when the meal is done, the power switch may be moved to an "OFF" position. At step 375, the feed arm assembly automatically moves to a storage position 142. At step 380, the power is shut down. The user may selectively activate the user input device 28 to operate the self-feeding device 10, and the order of operation is selectively determined by the user.

Advantageously, the self-feeding device 10 increases the user's 12 sense of control, independence and enjoyment of dining. Comfort is established by the stylish and ergonomic design of the self-feeding device 10. The feed arm assembly 26 of the present application is designed to emphasize the human factors normally experienced while eating. These may include items such as mimicking the typical dynamic and kinematic motions or eating, providing an aesthetic design consistent with most tableware, and providing an intuitive dining experience. The self-feeding device 10 may be fully programmable to specify the movement and position of the feeding arm assembly 26 to accommodate the user 12 in consideration of the height of the table and/or the height of the chair which the user 10 is sitting upon.

The present disclosure has been described in an illustrative manner. It is to be understood that the terminology which has been used is intended to be in the nature of words of description rather than of limitation. Many modifications and variations of the present example are possible in light of the above teachings. Therefore, within the scope of the appended claims, the present disclosure may be practiced other than as specifically described.

The invention claimed is:

1. A feeding device comprising:
a food compartment;
a feed arm operative to transfer food from the food compartment to an individual; and
a sensor, said sensor used to determine the quantity of food contained in the food compartment.

2. A feeding device as set forth in claim 1 including said sensor used to determine the type of food contained in the food compartment.

3. A feeding device as set forth in claim 1 including:
a database;
a processor, said processor receiving information from said sensor and operative to identify the nutritional value of the food contained in the food compartment based in part on information from said sensor.

4. A feeding device as set forth in claim 1 wherein said sensor includes a camera.

5. A feeding device as set forth in claim 1 wherein said sensor includes a load cell.

6. A feeding device as set forth in claim 1 including:
a sensor monitoring physical data of the individual, said physical data at least one of the following blood pressure, glucose levels, pulse, tidal carbon dioxide, oxygen level, heart rate, temperature, respiration rate and other biometric values; and
a communication module, said communication module receiving and transmitting said physical data to a remote location.

7. A feeding device as set forth in claim 1 including:
a camera operative to capture images of both the individual and the food; and
a communication module, said communication module receiving and transmitting said images to a remote location.

8. A feeding device comprising:
a food compartment;
a feed arm operative to transfer food from the food compartment to an individual; and
a sensor, said sensor used to determine the type of food contained in the food compartment.

9. A feeding device as set forth in claim 8 including:
a database;
a processor, said processor receiving information from said sensor and operative to identify the nutritional value of the food contained in the food compartment based in part on information from said sensor.

10. A feeding device as set forth in claim 8 wherein said sensor includes a camera.

11. A feeding device comprising:
a food compartment;
a feed arm operative to transfer food from the food compartment to an individual; and
a sensor, said sensor used to determine the type of food contained in the food compartment;
a sensor monitoring physical data of the individual, said physical data at least one of the following blood pressure, glucose levels, pulse, tidal carbon dioxide, oxygen level, heart rate, temperature, respiration rate and other biometric values; and
a communication module, said communication module receiving and transmitting said physical data to a remote location.

12. A feeding device as set forth in claim 8 including:
a camera operative to capture images of both the individual and the food; and
a communication module, said communication module receiving and transmitting said images to a remote location.

* * * * *